United States Patent [19]
Rosenblatt et al.

[11] Patent Number: 5,326,546
[45] Date of Patent: Jul. 5, 1994

[54] METHOD AND APPARATUS FOR CHLORINE DIOXIDE MANUFACTURE

[75] Inventors: Aaron Rosenblatt, New York, N.Y.;
David H. Rosenblatt, Baltimore, Md.;
David Feldman, New York, N.Y.;
Joseph E. Knapp, Pittsburgh, Pa.;
Diane Battisti, Greensburg, Pa.;
Badie Morsi, Pittsburgh, Pa.

[73] Assignee: Iolab Corporation, Claremont, Calif.

[21] Appl. No.: 875,509

[22] Filed: Apr. 29, 1992

Related U.S. Application Data

[62] Division of Ser. No. 408,153, Sep. 14, 1989, Pat. No. 5,110,580.

[51] Int. Cl.$^5$ ............................ C01B 7/00; C09K 3/00
[52] U.S. Cl. ................................ 423/241; 252/182.11
[58] Field of Search ............................ 423/241, 240; 252/182.11

[56] References Cited

U.S. PATENT DOCUMENTS 2,309,457  1/1943  Hutchinson et al. ............... 423/477
5,110,580  5/1992  Rosenblatt et al. ................ 423/472

FOREIGN PATENT DOCUMENTS 2152519  12/1985  Japan .

Primary Examiner—John Niebling
Assistant Examiner—Brendan Mee
Attorney, Agent, or Firm—Joseph F. Shirtz

[57] ABSTRACT

A method and apparatus for the generation, use, and disposal of chlorine dioxide is disclosed. A solid sodium chlorite composition having impurities, at least one of which is sodium hydroxide, is contacted with an agent to consume essentially all of the sodium hydroxide. Chlorine dioxide gas is then generated by contacting the resultant composition with chlorine in a humidified inert carrier gas. The resultant chlorine dioxide gas mixture may then be treated to remove chlorine gas present therein by contacting the same with soda-lime in particulate form. After using the chlorine dioxide gas mixture in the desired manner, chlorine dioxide present in the spent effluent gas may be substantially removed via the introduction of the effluent gas into an aqueous solution of sodium thiosulfate having a sufficient amount of an inorganic base to maintain the alkalinity of the solution during consumption of thiosulfate by chlorine dioxide.

3 Claims, 14 Drawing Sheets

METHOD AND APPARATUS FOR CHLORINE DIOXIDE MANUFACTURE

This is a division of application Ser. No. 408,153, filed Sep. 14, 1989, now U.S. Pat. No. 5,110,580 which is hereby incorporated by reference.

FIELD OF THE INVENTION

The present invention relates to the efficient preparation of chlorine dioxide by reacting a gaseous stream of chlorine gas in a column packed with solid sodium chlorite and the efficient elimination thereof.

BACKGROUND OF THE INVENTION

Chlorine dioxide is a gas of known utility. Recently, the use of chlorine dioxide gas for chemosterilizing surfaces, especially gas impermeable surfaces of implements commonly employed in the medical sciences, including surfaces formed from porcelain, ceramics, metals, plastics and glass has been disclosed, for example in U.S. Pat. Nos. 4,504,442 and 4,681,739 (Rosenblatt et al.).

There are known methods for producing chlorine dioxide gas. In one of these methods, sodium chlorite is reacted with chlorine gas in a chlorine dioxide generating apparatus. When the chlorite is in solid form, the chlorine dioxide generating apparatus can be, for example, a conventional column, or a bed filled with the chlorite.

In U.S. Pat. No. 2,309,457 (Hutchinson et al.), chlorine gas diluted with an inert gas such as air or nitrogen is brought into contact with a bed or column of solid chlorite and caused to react therewith to form chlorine dioxide and the corresponding chloride. The chlorite is preferably in flaked or finely-divided form. The chlorine may be dry or may contain water vapor. Similarly, the chlorite may be dry or contain about 5% moisture. The chlorine dioxide produced is said to be substantially free from chlorine when the gas feed rate and the supply of fresh chlorite is properly adjusted.

U.S. Pat. No. 4,689,169 (Mason et al.) describes a dry composition for producing chlorine dioxide gas consisting of a dry inert diluent such as sodium chloride, a metal chlorite such as sodium chlorite, and a dry oxidizing agent as chlorine or a dry acidic agent such as citric acid, which is capable of reacting with the metal chlorite in the dry state to produce chlorine dioxide. The chlorine dioxide gas produced by the reaction of dry oxidizing or acidifying agent with dry sodium chlorite is mixed with the inert gas and a certain amount of unreacted chlorine gas.

U.S. Pat. No. 2,043,284 (Cunningham et al.) describes a process in which chlorine is reacted with an aqueous solution of sodium chlorite. Due to its chemical instability, the chlorine is diluted with an inert gaseous diluent such as nitrogen or air to produce chloride dioxide that is similarly diluted, in order to keep the concentration of chlorine dioxide within safe limits.

The chlorine dioxide gas produced by methods such as those discussed above may then be used for its desired purpose, or may be subjected to further treatment prior to use to remove any chlorine gas which may also be present. Since chlorine dioxide is sometimes used in operations in which the presence of even a small amount of chlorine renders it unsuitable (e.g., because chlorine is highly corrosive), it is often desirable to remove chlorine gas from the chlorine/chlorine dioxide gas mixture.

Methods are known in the art for separating chlorine from the gas mixture. For example, U.S. Pat. No. 2,036,375 (Vincent) describes a method whereby the gas mixture including chlorine is contacted with the oxides, hydroxides, and various carbonates of magnesium, the alkali metals and the alkaline earth metals in substantially dry form. U.S. Pat. No. 2,131,447 (Logan) describes a method of preparing chlorine dioxide which is said to be completely free of chlorine by causing a regulated quantity of chlorine to react with a chlorite solution in a separate vessel removed from the stripping effect of the inert gas.

The chlorine dioxide gas which may or may not have been further treated as above thereafter may be fed to a further apparatus for use. Once the chlorine dioxide gas has been used for its intended purpose, it must be eliminated in some manner.

Effluent gas containing the chlorine and/or chlorine dioxide should not be directly released to the atmosphere. After use, gaseous mixtures containing chlorine or chlorine dioxide should be subjected to further treatment. Chlorine and/or chlorine dioxide may be absorbed or adsorbed by other chemicals in order to reach maximum allowable OSHA exposure limits (for chlorine and chlorine dioxide, these are 1 and 0.1 ppm, respectively, for an 8-hour time waited average exposure).

Efforts have been made to remove chlorine and/or chlorine dioxide from an effluent gas prior to release of the effluent gas into the atmosphere. Witches brew (which includes sodium hydroxide and potassium salts) has been used as a scrubbing solution but is problematic because it is a variable mix and thus unreliable, subject to pH and thermal excursions, and produces undefinable reactant products which may pose serious waste disposal concerns.

Sodium thiosulfate solution has been used as scrubbing agent, but has drawbacks. The reaction produces sulfuric acid, which reaction is exothermic, thus potentially making the solution hot. This heating may result in a variety of unpredictable side reactions forming a potentially broad range of undesirable reaction products. The reaction also causes the solution to become acidic, which reverses the reaction and causes the sodium chlorite product to revert to chlorine dioxide. Other solutions considered for use as scrubbing liquors for chlorine dioxide removal in bleach plant waste gases include sulfur dioxide solution, hypochlorite solution, caustic solution, and water. Japanese Patent No. 75,139,077 (1975; Aoki, Y.) describes the removal of chlorine and chlorine dioxide from waste gases by countercurrent scrubbing with a white liquor consisting of NaOH (59.3 kg.m$^3$), Na$_2$CO$_3$ (14.8 kg/m$^3$), Na$_2$S (25.5 kg/m$^3$) Na$_2$SO$_4$ (0.2 kg/m$^3$) in the ratio of 100 parts waste gas to 1 part liquor. Japanese Patent No. 7,557,883 (1975; Mitsuta, H.) describes the removal of chlorine dioxide by exchanging the gases in a column filled with active carbon granules sprayed with water at the top.

SUMMARY OF THE INVENTION

The present invention relates to a method and composition for generating chlorine dioxide gas comprising contacting a composition comprising preferably at least about 70 percent solid sodium chlorite by weight and impurities, at least one of which is sodium hydroxide, with an agent which substantially consumes essentially all of the sodium hydroxide to provide a composition which when contacted with chlorine gas in an inert gas stream efficiently and promptly produces chlorine dioxide gas. In a preferred embodiment, the agent comprises carbon dioxide gas.

The present invention is also related to a method for efficiently and promptly generating chlorine dioxide gas, comprising contacting a composition comprising the aforementioned solid sodium chlorite composition with a sufficient quantity of a first agent, which is preferentially more reactive with sodium hydroxide over sodium chlorite, and thereafter contacting the resulting composition with a second agent reactive with sodium chlorite to produce chlorine dioxide.

The present invention also relates to a composition for selectively removing chlorine gas from a gaseous stream comprising chlorine and chlorine dioxide, comprising solid soda-lime in particulate form. Preferably, the soda-lime particles are substantially spherical and have an average particle size of about 10 mesh or smaller. Depending on the geometry of the column, the particle size of the soda-lime is preferably minimized while the packing density of the soda-lime and contact time with the gaseous stream are maximized versus the required flow rate of the gaseous stream.

The present invention also relates to a scrubbing solution for removing chlorine dioxide from a gas stream, comprising an aqueous solution comprising sodium thiosulfate and a sufficient amount of an inorganic base and/or a high pH buffer to maintain the alkalinity of the aqueous solution during consumption of sodium thiosulfate by chlorine dioxide. Preferably, the chlorine dioxide is substantially more reactive with the sodium thiosulfate than with the base. In a preferred embodiment, the base comprises sodium hydroxide.

The present invention also relates to an apparatus for the generation, use, and disposal of chlorine dioxide gas. A chlorine dioxide generator comprises solid sodium chlorite which has been pretreated with an agent to substantially consume sodium hydroxide. A gas line is connected to an inlet of the generator for providing the generator with humidified and diluted chlorine gas. An adsorption means is connected to an outlet of the generator for substantially removing chlorine from the chlorine dioxide gas mixture produced in the generator. The adsorption means preferably comprises soda-lime in particulate form. A chamber is connected to the adsorption means for receiving the purified chlorine dioxide gas mixture from the adsorption means for treatment of product. The chamber is preferably adapted to hold articles to be sterilized with chlorine dioxide gas. A scrubber is connected to the sterilization chamber for receiving effluent gas from the sterilization chamber and eliminating substantially all of the remaining chlorine dioxide contained therein. The scrubber comprises an aqueous solution of sodium thiosulfate and a sufficient amount of a base to maintain the alkalinity of the aqueous solution during consumption of the thiosulfate by chlorine dioxide.

BRIEF DESCRIPTION OF THE DRAWINGS

The following drawings are illustrative of embodiments of the invention and are not meant to limit the scope of the invention as encompassed by the claims.

DETAILED DESCRIPTION

Figure 1:
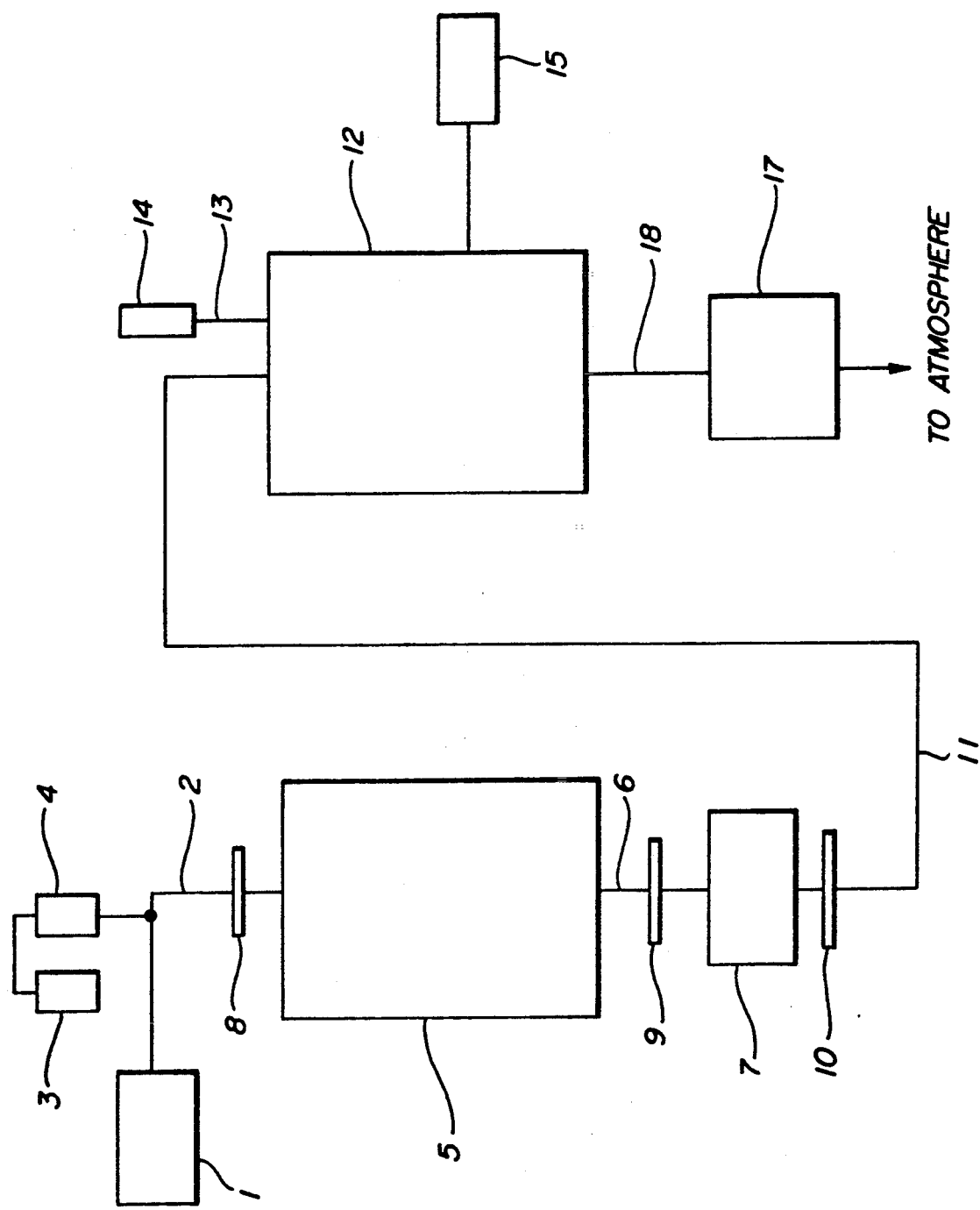
FIG. 1 is a block diagram of an overall chlorine dioxide generation, utilization, and elimination apparatus in accordance with the present invention.

The production of chlorine dioxide from sodium chlorite is preferably begun by introducing a gaseous stream comprising chlorine gas into a chlorine dioxide generator i.e., a sodium chlorite column, bed, or the like under ambient pressure and temperature. The chlorine gas is preferably diluted with an inert carrier gas such as nitrogen.

A greatly simplified description of the reaction of the chlorine gas with the sodium chlorite is as follows:

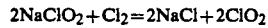

$$2NaClO_2 + Cl_2 = 2NaCl + 2ClO_2$$

Since chlorine dioxide gas is relatively unstable, the chlorine gas concentration in the feed gas is preferably limited to about 5–7.5 percent. Since two moles of chlorine dioxide are theoretically produced for every mole of chlorine gas, a gas stream comprising about 10–15 percent chlorine dioxide is produced. More preferably, the chlorine gas is included in the feed gas at a concentration of about 1–4 percent, and most preferably at a concentration of about 2 percent. The reaction is preferably conducted at mild temperatures, i.e., not higher than about 45° C.

The solid sodium chlorite composition used in the preparation of the chlorine dioxide preferably comprises from about 70 to about 90 percent sodium chlorite and includes impurities, at least one of which is sodium hydroxide. The sodium hydroxide may comprise, for example, up to about 3 percent of the composition. Preferably, the solid sodium chlorite comprises from about 79.0 to about 85.0 percent sodium chlorite, from about 5 to about 16 percent sodium chloride, up to about 4 percent sodium chlorate, up to about 2 percent sodium carbonate, up to about 3 percent sodium hydroxide, up to about 3 percent sodium sulfate, and from about 1.6 to about 6 percent water (by difference), by weight. One such solid sodium chlorite composition is Technical Sodium Chlorite Product No. 135800, Chemical Abstract Services (CAS) No. 7758-19-2, commercially available from Olin Chemicals, Stamford, Conn., which contains 79.86% $NaClO_2$, 13.30% $NaCl$, 4.28% $H_2O$, 0.91% $NaClO_3$, 0.86% $Na_2CO_3$, 0.75% $NaOH$, and 0.04% $Na_2SO_4$, by weight. Technical grade sodium chlorite is preferred for use in chlorine dioxide gas generation systems over reagent grade (98% pure) sodium chlorite, as it has been found to be much more efficient.

Initially, when the chlorine feed gas is fed into a column comprising untreated solid sodium chlorite composition, the sodium chlorite reaction a lag time (induction time) occurs before the system starts producing a steady state of chlorine dioxide. In the commercial setting, this occurrence of a lag time is undesirable because it delays the production of the chlorine dioxide. In the case where the chlorine dioxide is used for sterilization of articles, the lag time slows the completion of this process. The induction period is variable because of the variability of sodium hydroxide concentration in various samples of solid (technical grade) sodium chlorite. The variable induction period hinders the ability of an automated process controller to provide an on-demand, steady-state production of quantitatively predictable amounts of chlorine dioxide gas.

The occurrence of a lag time suggests that one or more side reactions may be occurring between the chlorine gas and components other than the sodium chlorite. After completion of this reaction(s), almost all of the chlorine reacts with the sodium chlorite, and chlorine dioxide begins to appear at almost a steady state rate.

It has surprisingly been discovered that the chlorine gas introduced into the column reacts preferentially with the sodium hydroxide impurity of the untreated solid (technical grade) sodium chlorite over the sodium chlorite component. This sodium hydroxide preference causes the afore-mentioned lag time.

Sodium hydroxide is present in technical grade sodium chlorite because it is used in the preparation of the same. The solid sodium chlorite is prepared, for example, by treating a 10–12% chlorite dioxide gaseous mixture with a mixture of hydrogen peroxide, sodium hydroxide and water (the hydrogen peroxide and sodium hydroxide preferably in a 1:1 ratio), thereby producing sodium chlorite. The sodium chlorite composition produced may then be subjected to a number of further processes, such as filtering, drying, treating with inert stabilizers, etc.

The lag time during the chlorine dioxide generation have now been substantially eliminated by the present invention by pretreating the solid sodium chlorite composition with an agent which is preferentially reactive with sodium hydroxide over sodium chlorite. By using an agent having such a selective reactivity, the sodium hydroxide can be essentially consumed without significantly altering the concentration of sodium chlorite.

Examples of suitable agents are carbon dioxide gas and dilute chlorine gas. Examples of other agents which may be useful for substantially consuming essentially all of the sodium hydroxide component of commercial grade sodium chlorite include weak acid gases or vapors such as hydrogen chloride, carboxylic acid, acetic acid, and others. In preferred embodiments of the present invention, the agent comprises carbon dioxide gas.

When the sodium chlorite column is pretreated to remove sodium hydroxide as above, a very mild exothermic front is produced during the chlorine dioxide generation which travels through the column very slowly as the sodium chlorite is used up. After a period of time, chlorine begins to appear with the chlorine dioxide at the outlet of the column. This time is referred to as a breakthrough time. After the breakthrough time, the concentration of chlorine dioxide rapidly drops to zero and the chlorine concentration starts to steadily increase until it reaches that of the feed gas.

Preferably, the sodium chlorite reaction is conducted in the presence of moisture. The addition of moisture increases the yield of chlorine dioxide generated and substantially increases the life of the column substantially without causing any undesirable side reactions. The introduction of moisture may be accomplished by humidifying the solid sodium chlorite composition in the column prior to the start of chlorine dioxide generation, or by humidifying the diluted chlorine gas mixture prior to its introduction into the column. Most preferably, both of these procedures are carried out.

The solid sodium chlorite composition is preferably substantially humidified via a humidified inert gas. By "substantially humidified", it is meant that the solid sodium chlorite is humidified up to but not exceeding 100 percent relative humidity. It is also preferred that the chlorine feed gas be humidified immediately prior to its introduction into the column. The point at which the column is totally humidified may be determined by measuring the moisture of the inert gas which has passed through the column. If substantially desiccated chlorine gas is fed to the column, the life of the column is reduced.

Since light (especially ultraviolet light) catalyses the decomposition of chlorine dioxide to chlorine and oxygen, the chlorine dioxide generation is preferably conducted in the dark or very subdued light. The flow of feed gas into the column is preferably downward, to substantially eliminate channelling of the chlorine gas through the sodium chlorite.

The efficiency of the chlorine dioxide production may be further enhanced by adjusting other parameters which effect the chlorine dioxide generation. Such parameters effecting the rate of generation of chlorine dioxide include the purity of the solid sodium chlorite composition, the chlorine concentration in the feed gas, the inert gas flow rate, the height of the column, and the particle size of the sodium chlorite. Increasing the concentration of chlorine gas in the feed gas can produce shorter column life, although higher concentrations of chlorine dioxide gas can be generated. Humidifying the feed gas can increase the amount of chlorine dioxide produced.

The generation capacity of the sodium chlorite column can be monitored by monitoring the thermal behavior of the column. This may be accomplished, for example, via a thermocouple connected in proximity to the outlet of the column. The thermocouple allows the operator to determine when the column is exhausted (via a temperature change). The thermocouple may in turn be connected to a control means which automatically changes the flow of feed gas into another column when the thermocouple indicates that the column is exhausted.

In a preferred embodiment of the present invention, chlorine gas (which may be present in the flow of chlorine dioxide gas stream) is substantially removed by injecting the chlorine dioxide gas stream through a filter having a solid adsorbent comprising soda-lime particles. Soda-lime is a variable mixture of sodium hydroxide and calcium hydroxide and/or oxide.

It has surprisingly been discovered that the adsorption efficiency of solid soda-lime is much greater for chlorine than for chlorine dioxide when compared under the same operating conditions. More particularly (and as described in more detail infra), the highest chlorine dioxide adsorption Japacity ($ClO_2$ moles adsorbed/kg soda-lime) has been found to be lower than the lowest chlorine adsorption capacity ($Cl_2$ moles adsorbed/kg soda-lime).

The soda-lime particles are randomly shaped and preferably basically spheroidal. Chlorine adsorption by an adsorber comprising solid soda-lime is affected by the particle size of the soda-lime. It has been discovered that decreasing the average diameter of the soda-lime particles, for example from about 4 mesh to about 28 mesh, improves the adsorption efficiency of the soda-lime for chlorine. It has surprisingly been discovered that increasing the average diameter of the soda-lime particles, for example from about 10 mesh to about 4 mesh, improves the adsorption efficiency of chlorine dioxide. Accordingly, the soda-lime particles used in the adsorber of the present invention are preferably about 10 mesh or smaller so as to enhance the selectivity of the sorption of the soda-lime with chlorine as opposed to chlorine dioxide. Most preferably, the soda-lime particles have an average diameter of 16 mesh or smaller. Other parameters have also been found to affect chlorine adsorption onto soda-lime particles. For example, a relatively longer contact time may increase adsorption efficiency.

The efficiency of the adsorber can be monitored thermally. For example, thermocouples can be placed at the inlet and the outlet (or both) of the adsorber in order to monitor the exothermic chlorine gas adsorption reaction. The efficiency of the adsorber decreases drastically after breakthrough (the point at which chlorine begins to appear at the outlet of the adsorber). Breakthrough can be estimated and/or monitored by its relationship to the exothermic front caused by the chlorine adsorption reaction. Further monitoring of the remaining adsorption capacity can be accomplished by the inclusion of additional thermocouples along the length of the adsorber to more closely monitor the position of the exothermic front.

The purified gas comprising diluted chlorine dioxide thus produced may then be used in any manner desired. In one preferred embodiment, the purified gas is introduced into a sterilization chamber for chemosterilizing the surfaces of microbiologically contaminated articles, such as the dry and gas impermeable surfaces of medical or dental implements or other articles contaminated with live bacteria and bacterial spores.

In particular, the process of this invention may be employed to sterilize articles formed from glass, cellulosics, plastics, or the like which provide an essentially moisture-free substrate (e.g., a substrate with a less than about 10% moisture content or a substrate having some desiccated spores) for bacterial growth under ambient conditions. For example, medical or dental or other articles formed from any one or more of the following commonly employed materials may be sterilized in accordance with the process of this application: aluminum, aluminum oxide, chromed brass, cotton, gauzes (or cellulosics), copper, polyesters, ethylene vinyl acetate, latex, "Mylar", "Neoprene" nickel plated cold formed steel, "Nylon", platinum polycarbonates, polyethylene, polymethylmethacrylate, polypropylene, styrene, Teflon, polyurethane, polyvinylalcohol, polyvinylacetate, polyvinyl chloride, pryolytic and vitreous carbons, silicones, stainless steels, sterling silver, titanium, tungsten carbide, "Tygon", glass, ceramics, etc. The process may also be employed to sterilize articles contained in packaging which is permeable to gaseous chlorine dioxide.

In one embodiment of the present invention the gas impermeable surfaces contaminated with bacterial spores is contacted with an effective amount of the purified chlorine dioxide at a temperature which does not overly exceed ambient temperature and for a time period sufficient to kill the bacterial spores on the contaminated surfaces. In another embodiment of the present invention, the above-mentioned chemosterilization is enhanced by exposing the articles to a gaseous atmosphere of controlled humidity immediately prior to and/or during exposure to the chlorine dioxide gaseous sterilant. These embodiments are disclosed in greater detail in U.S. Pat. Nos. 4,504,442 and 4,681,739 (Rosenblatt et al.), both of which are incorporated by reference.

As discussed in these patents, the article(s) may be placed in a closed chamber and a vacuum drawn on the chamber. Water or steam may then be injected into the evacuated chamber to provide the desired humidity level in the chamber. In further embodiments, a stream of moist air and a separate stream of diluted chlorine dioxide gas may be introduced at the same time into the chamber. Alternatively, diluted chlorine dioxide gas may be mixed with water vapor or moist air, and the humid gaseous chlorine dioxide mixture introduced into the chamber.

The particular concentration of the diluted chlorine dioxide gas used is dependent upon several factors, including the inherent ability of the particular spores or live bacteria to resist the action of the sterilant, as well as exposure time, and humidity conditions. In general, the concentration of the chlorine dioxide in the inert gas is from about 1.0 mg/L (milligrams per liter) to about 300 mg/L.

Sterilization with the humid gaseous chlorine dioxide is preferably conducted at room temperature to about 30° C., and the relative humidity is preferably above 60%, and most preferably about 70–95%. The contaminated article(s) is preferably contacted with the humid sterilant for about 1 hour to about 4 hours or longer.

In another embodiment of the present invention, the purified gas comprising diluted chlorine dioxide is used in the utilization system disclosed in U.S. application Ser. No. 184,514 (Jefferis, III et al.) filed Apr. 14, 1988 and incorporated by reference herein. As discussed in greater detail therein, the system includes computer means such as a microprocessor for controlling the generation, use and removal of the gas from the sterilization chamber. The computer means may execute a predetermined sequence of steps so as to cycle the utilization system through a series of successive states so as to define a cycle in which the article is treated by the gas and the gas is thereafter removed from the chamber so as to render the atmosphere in the chamber within acceptable standards of safety. The computer means may include, for instance, control the valves which supply the gas to the sterilization chamber and which remove the gas from the chamber after a predetermined period of time. The computer means may also include means for aborting the operation of the utilization system to one of a plurality of defined failure states in response to a failure of the apparatus, the selected failure state dependent on the state in the cycle in which the failure occurred.

The effluent gas mixture comprising chlorine dioxide which is removed from the sterilization chamber is preferably treated after use to remove remaining chlorine dioxide prior to releasing the gas mixture into the atmosphere. This treatment may be accomplished via any manner known in the art.

Preferably, however, the elimination of the remaining chlorine dioxide from the gas mixture is accomplished by the novel scrubber of the present invention, which comprises a mixture of aqueous sodium thiosulfate with a base which is less reactive with chlorine dioxide compared to sodium thiosulfate.

Aqueous sodium thiosulfate solutions have been used in the past for scrubbing chlorine dioxide from gas streams. Although the reaction should theoretically proceed until the thiosulfate is exhausted, sodium thiosulfate has found limited use as a scrubbing agent for chlorine dioxide because its scrubbing capacity is low. The chlorine dioxide is reduced by the thiosulfate, generating sulfuric acid and sodium chlorite, and possibly other products.

It has been found that breakthrough of chlorine dioxide through the scrubber is always preceded by a dramatic shift in the pH of the solution from a pH of about 9–10 to about a strongly acid value, i.e., pH 2.

The pH shift to an acid value is detrimental for the following reasons. First, as the acid becomes more concentrated, the direction of the reduction reaction is reversed with chlorine dioxide being produced by the acidification of chlorite. Second, as the equilibrium is shifted back, the temperature of the solution increases. This result is undesirable because increased reaction kinetics of unpredictable and potentially undesirable side reactions occur.

It has now been surprisingly discovered that the addition of a sufficient amount of an inorganic base and/or a high pH buffer maintains the alkalinity of the aqueous scrubbing solution. Most preferably, the aqueous scrubbing solution is kept at a pH from about 11 to about 14. The chlorine dioxide is preferably substantially more reactive with the sodium thiosulfate than with the base or the high pH buffer.

Preferably, the base is added in an amount which permits the sodium thiosulfate to be essentially consumed without allowing the scrubbing solution to become acidic.

In a most preferred embodiment, the ratio of base to sodium thiosulfate in the scrubbing solution is about 1:1, by weight. Equal amounts (by weight) of base and sodium thiosulfate in the scrubbing solution allows the thiosulfate to be substantially consumed, as indicated by chlorine dioxide breakthrough, and in turn provide a greater scrubbing capacity.

Examples of bases are sodium and potassium hydroxide. An example of a high pH buffer is trisodium phosphate. Sodium hydroxide is preferred.

In a preferred embodiment, the concentration of sodium thiosulfate in the scrubbing liquid is from about 5 to about 20 percent by weight. Most preferred is an aqueous scrubbing liquid comprising about 20 percent sodium thiosulfate and about 20 percent sodium hydroxide. However, solutions with higher concentrations of either or both of these ingredients may provide the desired result. One skilled in the art will appreciate that scrubber efficiency will be effected by the chlorine dioxide content of the gas stream, the flow rate of the gas stream through the scrubber, among other things. Thus, the above percentages provide the preferred concentrations of sodium thiosulfate and sodium hydroxide for efficient scrubbing when the concentration of chlorine dioxide is up to about 10–30,000 ppm and the flow rate is about 0 to about 15 liters per minute. Proper sizing of the scrubber to accommodate the gas throughout as well as optimized flow rates may also enhance the efficiency of the scrubber.

FIG. 1 is a block diagram of a preferred apparatus for use in the present invention. Chlorine gas in chlorine gas storage vessel 1 is released into gas line 2, where it is combined with the humidified inert carrier gas (in this example nitrogen gas). The humidified nitrogen gas is obtained by bubbling nitrogen gas from nitrogen gas storage vessel 3 through bubbler 4.

The humidified and diluted chlorine feed gas is then injected into the chlorine dioxide generator 5. Chlorine dioxide generator 5 in this example is a column containing a cartridge of flaked technical grade sodium chlorite which has been pretreated with carbon dioxide to substantially consume the sodium hydroxide impurity therein. It is preferable to humidify the column 5 with the humidified inert gas prior to the production of chlorine dioxide.

The column 5 may, for example, be constructed of polyethylene and may be 30 inches in height and 3 inches internal diameter. It may contain 3500 g of the solid sodium chlorite composition, providing a packed height of 29 inches (packing density of about 17.1 g/in$^3$). The maximum flow rate of feed gas, for example, may be 10.5 liters/minute. The maximum humidified nitrogen gas flow rate may be about 2 liters/minute. Slower flow rates would preferably maintain this ratio. The bubbler 4 may be approximately the same size as the column 5 and is packed full with Pall rings. It may contain, for example, 500 ml of distilled water.

In column 5, the chlorine gas reacts with the flaked sodium chlorite to produce chlorine dioxide. The effluent gas which flows out of column 5 comprises chlorine dioxide, nitrogen, and potentially impurities such as chlorine. The chlorine dioxide gas stream is led via line 6 to adsorption means 7, which in the present example comprises a scrubber comprising soda-lime in particulate form.

In a preferred embodiment, a reference thermocouple 8 is provided in proximity to the inlet of column 5 to measure the temperature of the feed gas and at least one thermocouple is provided at a further point along or at the end of column 5. In this case, thermocouple 9 is provided in proximity to the outlet of chlorine dioxide generator 5 to monitor the reaction. The thermocouples provide a means for predicting the remaining generation capacity of the sodium chlorite cartridge. Preferably, the thermocouples are Type P thermocouples.

The adsorption means 7 selectively removes essentially all of the chlorine gas present in the chlorine dioxide gas stream. Preferably, at least one thermocouple 10 is provided, in this case in proximity to the outlet of the adsorption means 7, in order to monitor the remaining adsorption capacity of the soda-lime present therein.

The purified chlorine dioxide gas mixture which flows out of the adsorption means 7 then flows through line 11 and into sterilization chamber 12. The chlorine dioxide gas which flows into sterilization chamber 12 contacts the surface of the article to be sterilized for a predetermined time period. As previously explained, in certain embodiments of the present invention, a stream of moist air may be introduced into the sterilization chamber 12 via line 13 and steam generator 14 prior to and/or during exposure of the article to chlorine dioxide gas. Also, computer means 15 may be connected to sterilization chamber 12 to control the sterilization process as previously explained.

The now-spent effluent gas which is removed from sterilization chamber 12 via line 16 is then pumped into scrubber 17 via vacuum pump 18 prior to release into the atmosphere. Scrubber 17 comprises an aqueous sodium thiosulfate solution and sodium hydroxide in a 1:1 ratio. The effluent gas, which includes environmentally acceptable levels of chlorine dioxide and chlorine gas, may now be released into the atmosphere.

The scrubber, for example, may be 36 inches in height and may have a 6 inch internal diameter. It may be made of Type 316L stainless steel. The entrance may be fitted with a stainless steel disc having about 120 holes (each hole 1/16 inch diameter). The scrubber may be filled with polyethylene Pall rings and may contain about 2-4 liters of the scrubbing solution (comprising about 20 percent each of sodium thiosulfate and sodium hydroxide by weight).

DETAILED DESCRIPTION OF THE PREFERRED EMBODIMENTS

The following examples illustrate various aspects of the present invention. They are not to be construed to limit the claims in any manner whatsoever.

The concentrations of chlorine and chlorine dioxide in the examples are determined by the standard sodium thiosulfate-potassium iodide titration in which the gas in question is bubbled through a potassium iodide solution. The potassium iodide solution is then titrated with sodium thiosulfate solution of known normality.

EXAMPLE 1

Experiments are conducted in a laboratory scale 0.0127 meter (one-half inch) inside diameter pipe made of 304 stainless steel pipe packed with Technical Sodium Chlorite Product No. 135800 (Olin Chemicals) to examine the effects of chlorine feed gas humidity, sodium hydroxide content, pretreatment of the column with carbon dioxide prior to chlorine dioxide ($ClO_2$) generation.

Chlorine gas is mixed with nitrogen gas (via a nitrogen gas line), and the diluted chlorine (concentration of 1.09 mole%) is fed into the column at $5.0 \times 10^{-6}$ m$^3$/s (300 standard ml/min) into the column packed with commercial $NaClO_2$ to a height of 0.4826 meters (19 inches). The bulk density of the column is 637.79 kg/m$^3$.

Figure 2:
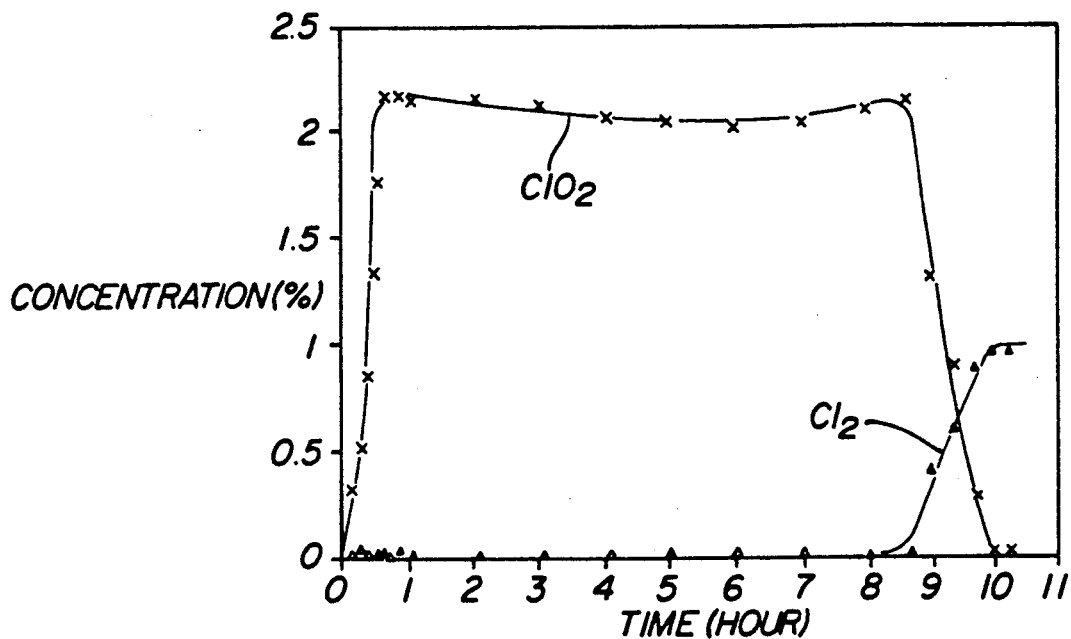
FIG. 2 is a graphical presentation of the chlorine and chlorine dioxide curves over time provided by Example 1.

The concentration of chlorine and chlorine dioxide at the exit of the column is determined over time. The results are graphically provided in FIG. 2.

From this graph, it can be observed that a lag time of about 39 minutes occurs before the system produces a steady state concentration of $ClO_2$. After a period of time (about 8.5 hours), chlorine begins to appear at the outlet of the column (i.e., breakthrough). After breakthrough, the concentration of $ClO_2$ rapidly drops to zero and the chlorine concentration increases until it reaches that in the feed gas.

Figure 3:
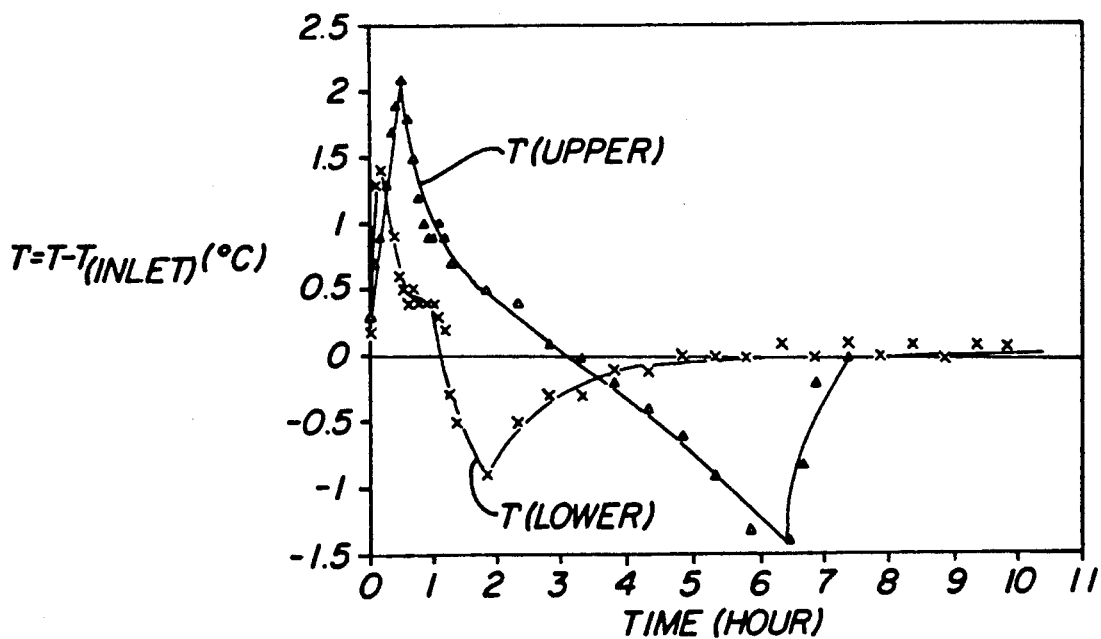
FIG. 3 is a graphical presentation of the thermal behavior of the column of Example 1 during $ClO_2$ generation over time.

The thermal behavior of this run is also examined via an upper thermocouple located at the inlet of the column and a lower thermocouple located about 0.1143 meters (4.5 inches) from the bottom of the pipe. FIG. 3 graphically presents the thermal behavior recorded during $ClO_2$ generation as thermocouple temperature minus the temperature at the inlet of the column over time. As can be seen, initially the sodium chlorite reaction is exothermic. The exothermic front travels upward through the column and reaches the lower thermocouple in about 3-5 minutes (as indicated by the maximum temperature). The total time needed for the exothermic front to breakthrough is about 40.6 minutes After the exothermic front passes through the column, an endothermic front appears. The time required for the endothermic front to reach the lower thermocouple is 390 minutes, and the total time needed for the endothermic front to breakthrough the column is 510 minutes.

Figure 4:
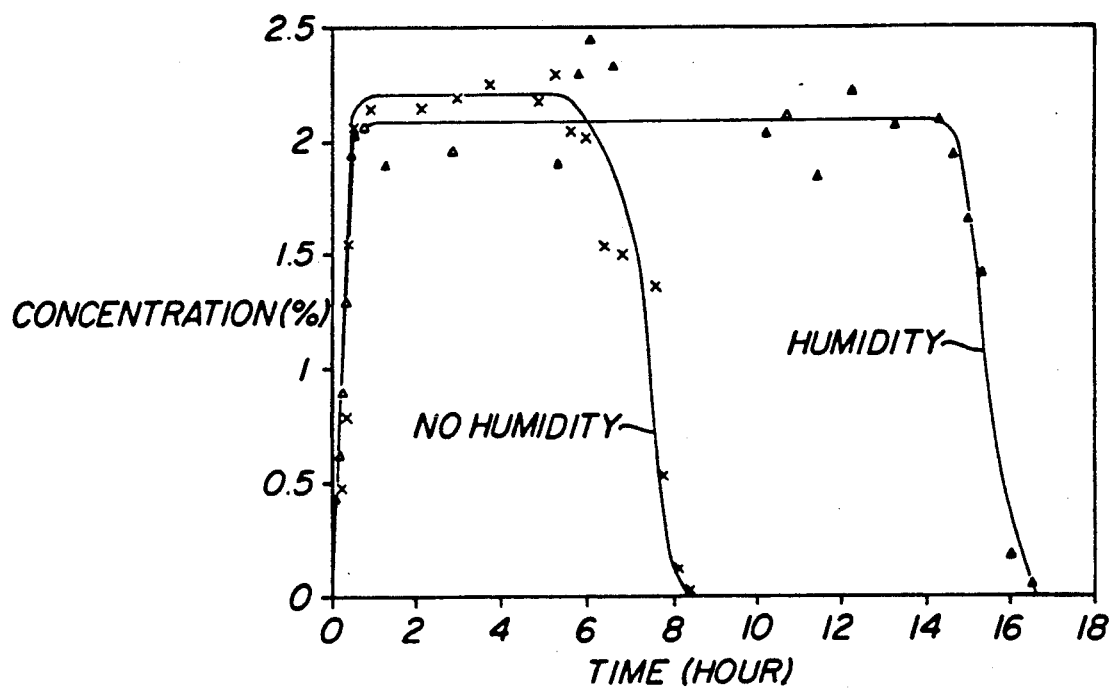
FIG. 4 is a graphical presentation produced by the humidified reaction of Example 1.

In order to examine the effect of humidity in the chlorine/sodium chlorite reaction, a glass bubbler containing $5 \times 10^{-4}$ m$^3$ (500 ml) of water is inserted into the nitrogen line to saturate the nitrogen gas stream before mixing with chlorine gas. The amount of chlorine dioxide produced over time is measured in a first run where humidity is added and a second run where no humidity is added. The chlorine concentration at the inlet of the column is 1.24 mole percent. The results are graphically presented in FIG. 4.

From these results, it can be seen that adding moisture to the feed gas almost doubles the breakthrough time and the cumulative amount of chlorine dioxide generated. It can also be seen that the monitoring of the temperature of the column makes it possible to determine the position of the reaction front in the column and the time needed to exhaust the sodium chlorite.

EXAMPLES 2-6

In Examples 2-6 and Comparative Example A, the effect of pretreating the column containing solid technical grade sodium chlorite is examined. In each of these examples, the monitoring of the temperature of the column makes it possible to determine the position of the reaction front in the column and the time needed to exhaust the sodium chlorite. Carbon dioxide gas is injected into the sodium chlorite column of Example 1 and thereafter the chlorine/nitrogen feed gas is injected into the column. In each of these examples, the nitrogen gas flow rate is $5.8 \times 10^{-6}$ m$^3$/s, the bulk density of the column is 637.79 kg/m$^3$, and the column height is 0.4826 m.

Figure 5:
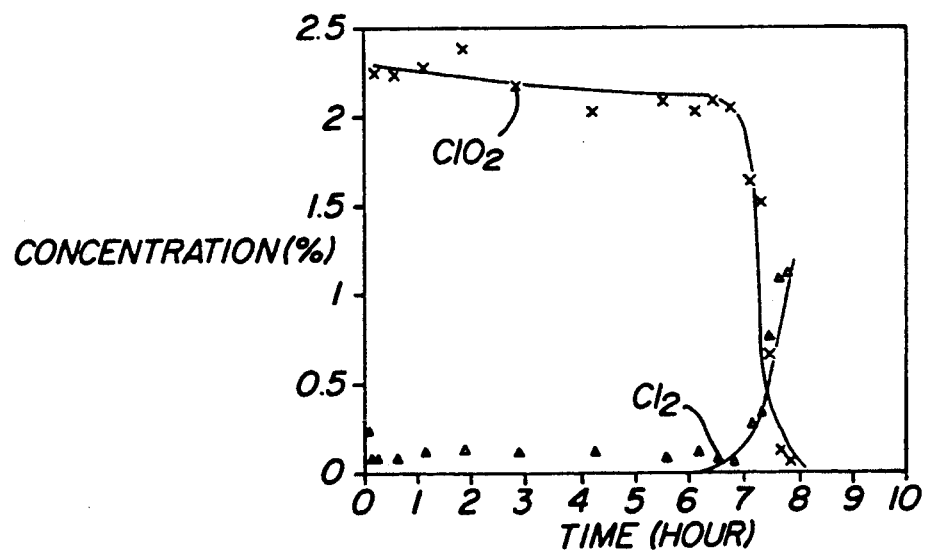
FIGS. 5 and 6 are graphical presentations of the $ClO_2$ generation provided in Example 2 by a column pretreated with 0.5 liters of $CO_2$.
Figure 6:
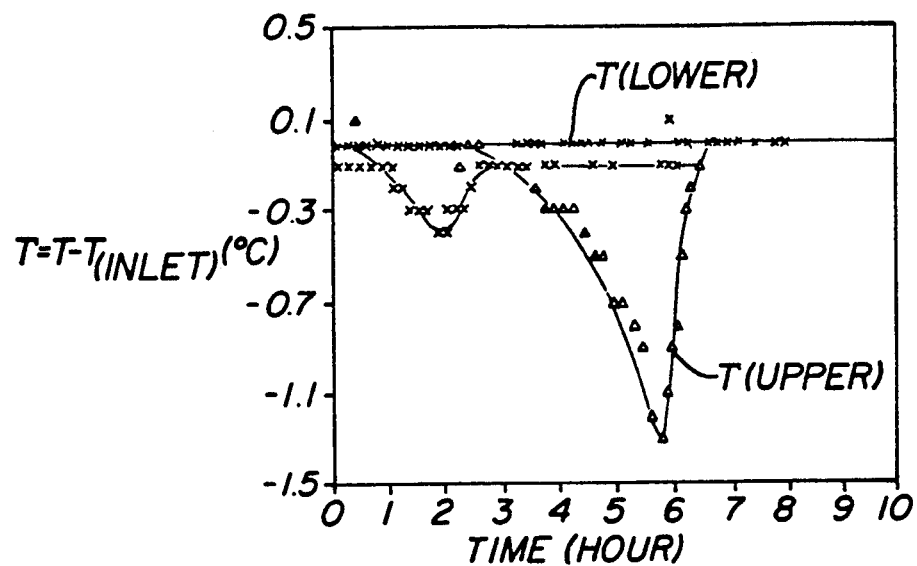
Figure 7:
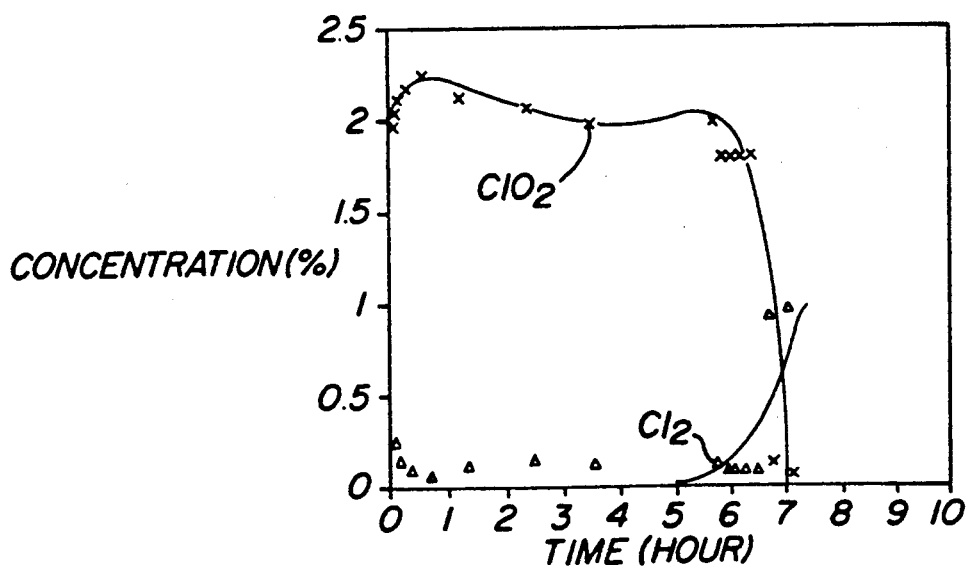
FIGS. 7 and 8 are graphical presentations of the $ClO_2$ generation provided in Example 3 by a column pretreated with 1.5 liters of $CO_2$.
Figure 8:
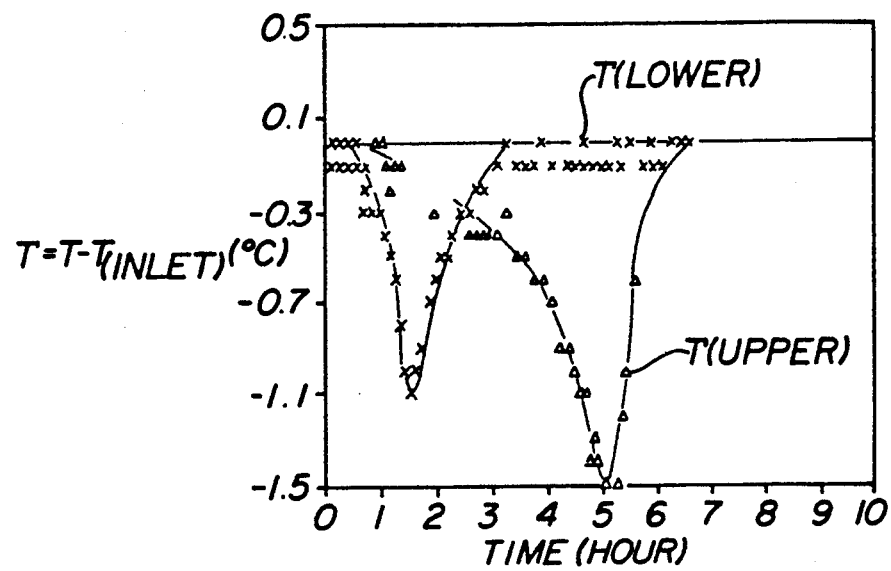
Figure 9:
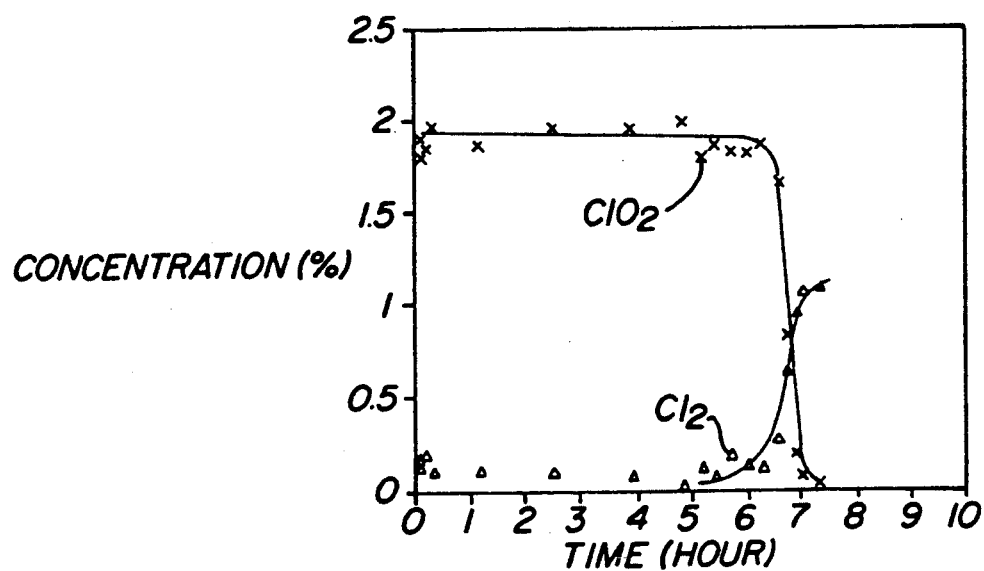
FIGS. 9 and 10 are graphical presentations of the $ClO_2$ generation provided in Example 4 by a column pretreated with 3 liters of $CO_2$.
Figure 10:
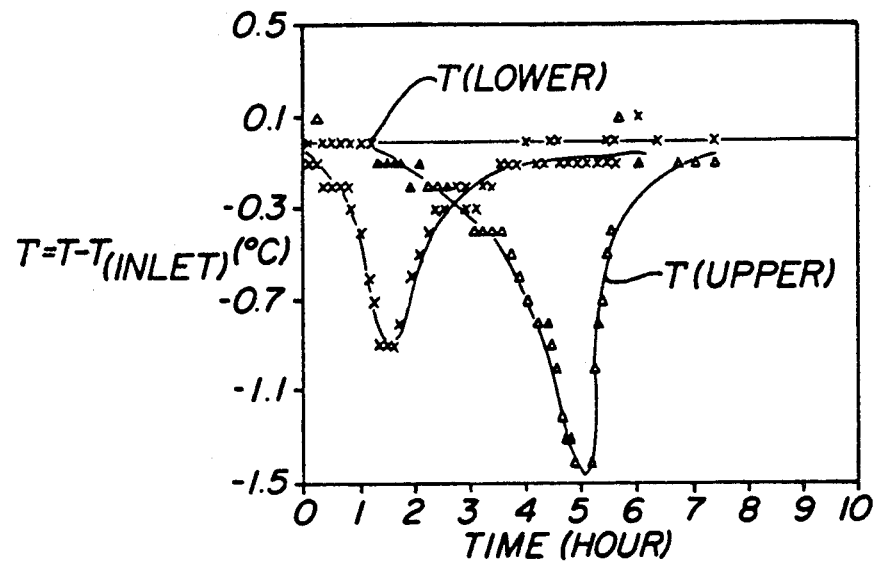
Figure 11:
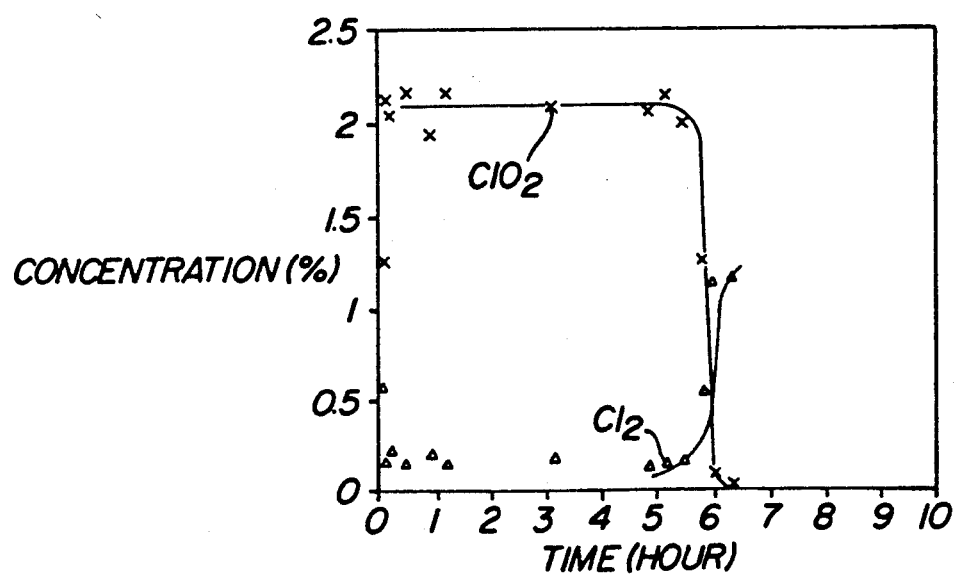
FIGS. 11 and 12 are graphical presentations of the $ClO_2$ generation provided in Examples 5 by a column pretreated with 4.2 liters of $CO_2$.
Figure 12:
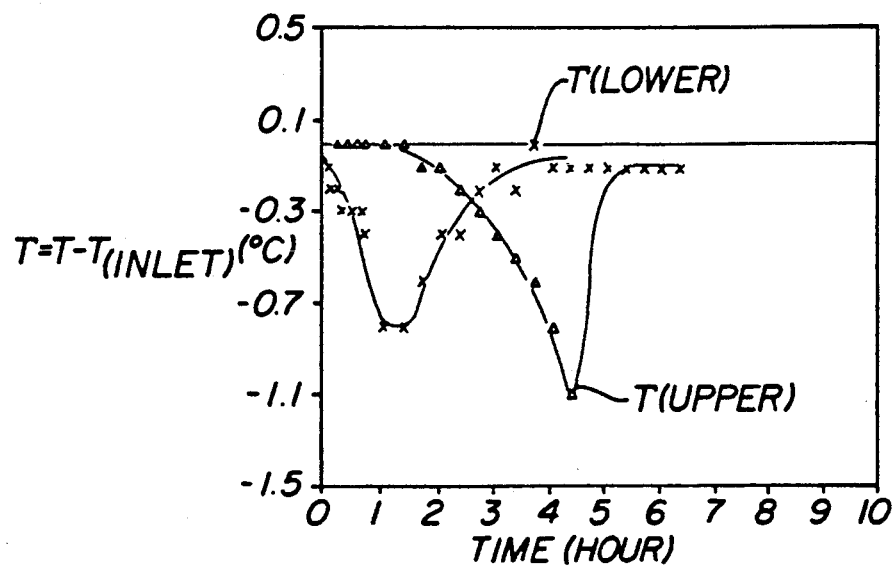
Figure 13:
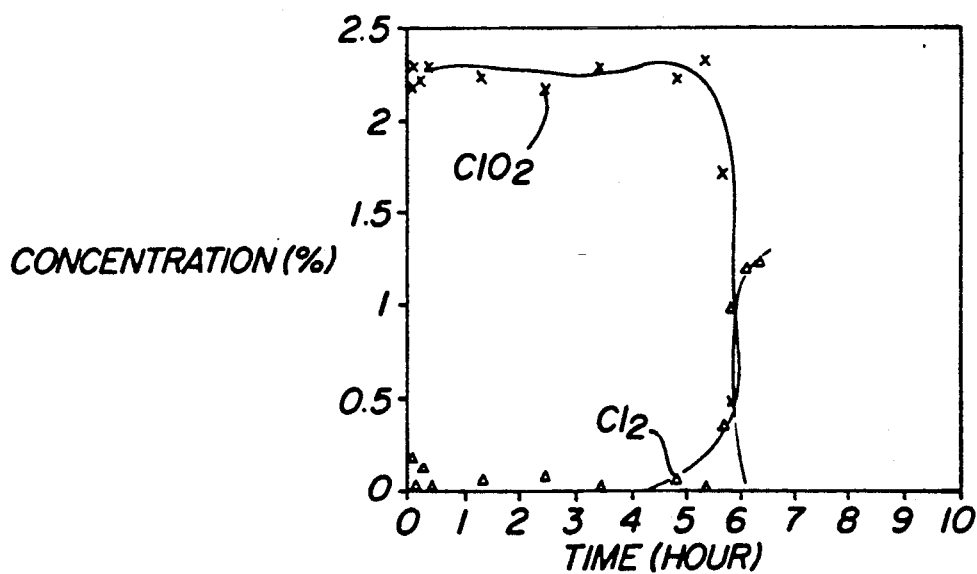
FIGS. 13 and 14 are graphical presentations of the $ClO_2$ generation provided in Example 6 by a column pretreated with 5 liters of $CO_2$.
Figure 14:
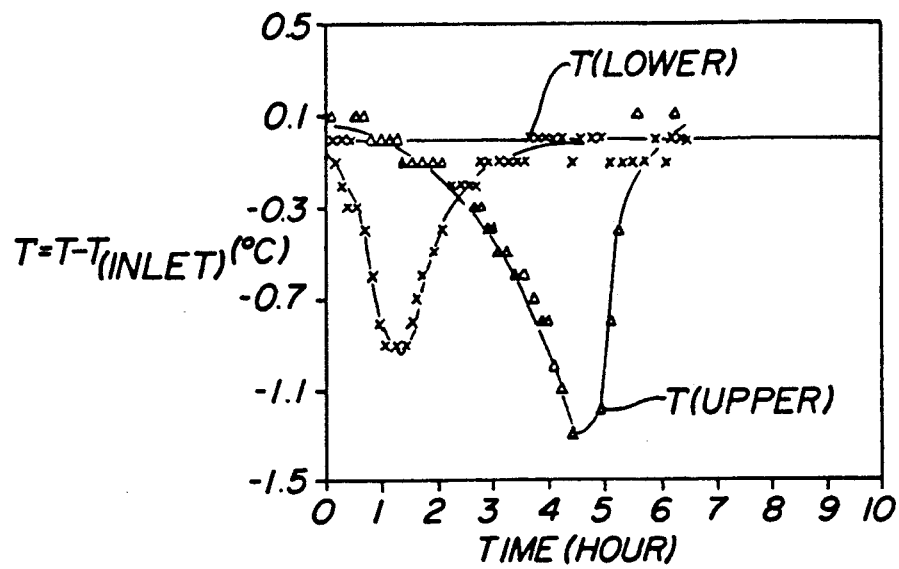

The amount of carbon dioxide injected into the sodium chlorite column is varied in each of Examples 2-6. In Example 2, 0.5 liters of carbon dioxide are injected into a sodium chlorite column. The results are graphically presented in FIGS. 5 and 6. In Example 3, 1.5 liters of carbon dioxide are injected into a sodium chlorite column. The results are graphically presented in FIGS. 7 and 8. In Example 4, 3 liters of carbon dioxide are injected into a sodium chlorite column. The results are graphically presented in FIGS. 9 and 10. In Example 5, 4.2 liters of carbon dioxide are injected into a sodium chlorite column. The results are graphically presented in FIGS. 11 and 12. In Example 6, 5.0 liters of carbon dioxide are injected into the column. The results are graphically presented in FIGS. 13 and 14.

Figure 15:
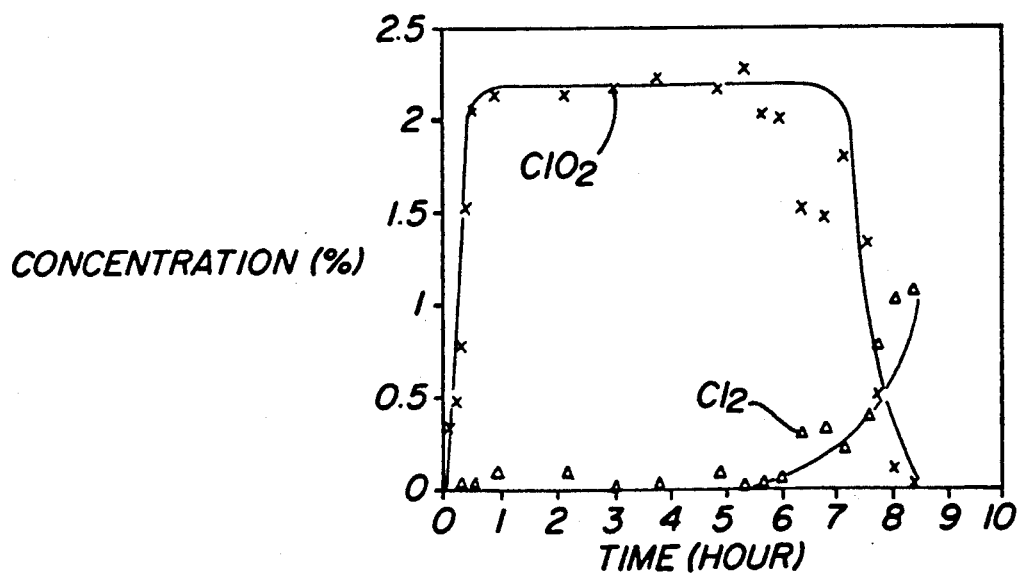
FIGS. 15 and 16 are graphical presentations of the $ClO_2$ generation provided in Comparative Example A where the column is not pretreated.
Figure 16:
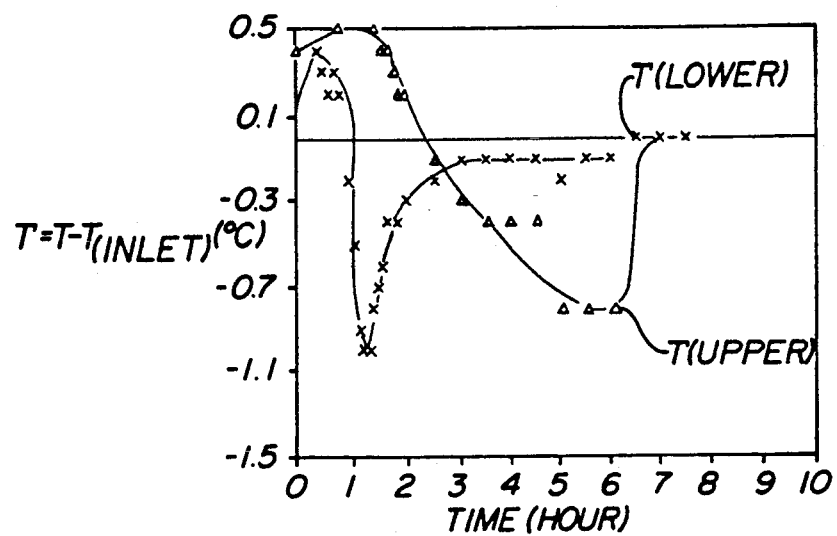

In Comparative Example A, the chlorine/nitrogen gas mixture is fed into a column which has not been pretreated with carbon dioxide. The results are graphically presented in FIGS. 15 and 16.

Further results of Examples 2-6 and Comparative Example A are detailed in Table 1.

TABLE 1

Effect of Sodium Chlorite Pretreatment with $CO_2$

| Ex. | $Cl_2$ | $CO_2$ | LT | BTT | $ClO_2$ | Y(%) |
|---|---|---|---|---|---|---|
| 2 | 1.290 | 0.50 | 0 | 420 | 0.1411 | 41.92 |
| 3 | 1.200 | 1.50 | 0 | 400 | 0.1186 | 35.23 |
| 4 | 1.180 | 3.03 | 0 | 387 | 0.1149 | 34.14 |
| 5 | 1.280 | 4.25 | 0 | 360 | 0.1077 | 32.00 |
| 6 | 1.280 | 5.00 | 0 | 330 | 0.1148 | 34.11 |
| A | 1.253 | 0.00 | 25 | 340 | 0.1339 | 39.78 |

$Cl_2$ = chlorine concentration in the inlet gas
$CO_2$ = liters of carbon dioxide injected into the column
LT = lag time (minutes)
BTT = breakthrough time (minutes)
$ClO_2$ = moles of $ClO_2$ generated
Y = (moles of $ClO_2$ generated/initial moles of $NaClO_2$)

From the graphs, it can be seen that the lag (induction) time is reduced to zero and the steady state concentration of chlorine dioxide is substantially attained immediately in Examples 2-6 where the columns are pretreated. Further, in the Figures showing the thermal behavior of the column, it can be seen that in the case of pretreatment with carbon dioxide, the exothermic front completely disappears and an endothermic front appears. These results further substantiate the hypothesis that the lag time is caused by sodium hydroxide.

From Table 1 it can be seen that the smallest amount of carbon dioxide used ($0.5 \times 10^{-3}$ $m^3$) corresponds to the largest amount of cumulative chlorine dioxide produced. Excess carbon dioxide may cause side reactions which reduce the breakthrough time.

EXAMPLE 7

In Example 7, the combined effect of humidity and pretreatment on chlorine dioxide generation is examined.

Figure 17:
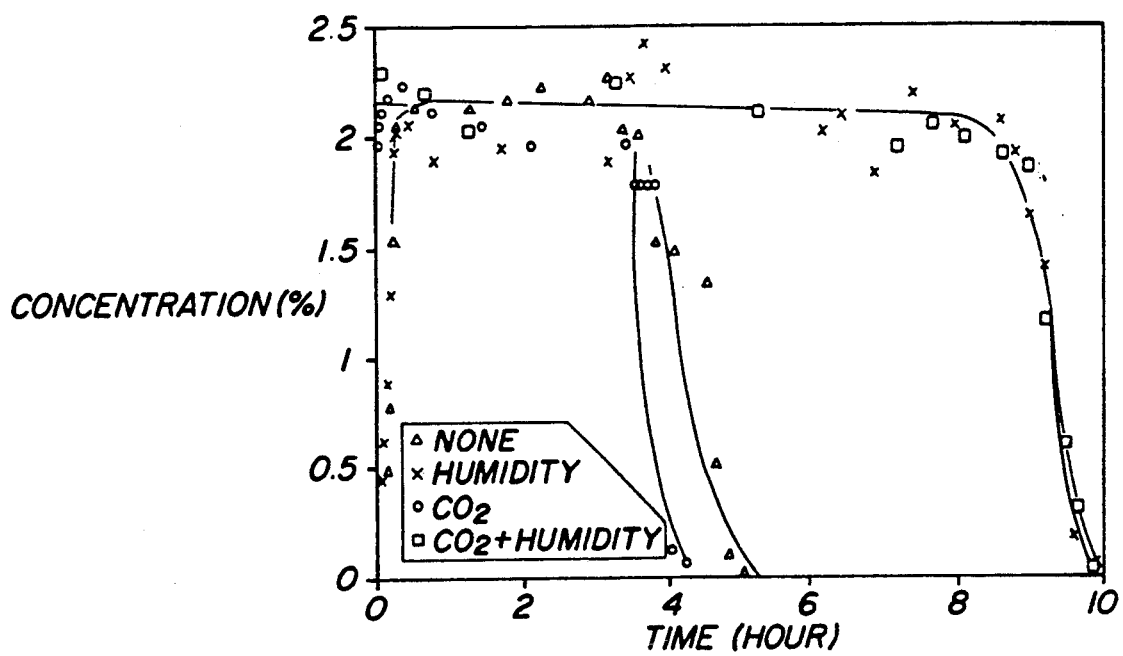
FIG. 17 is a graphical presentation of the $ClO_2$ generation provided in Example 7 where the column was pretreated with $CO_2$ and humidified.

A sodium chlorite column similar to that of Examples 2-6 is pretreated with 1.5 liters of carbon dioxide and reacted with humidified chlorine/nitrogen gas. The nitrogen gas flow rate is $5.8 \times 10^{-6}$ $m^3/s$, the generator bulk density is 637.79 $kg/m^3$ and the column height is 0.4826 m. Comparative Examples B-D are also run in which humidification and/or pretreatment is omitted. The results are provided in FIG. 17 and Table 2.

TABLE 2

Combined Effect of Humidity and Pretreatment

| Ex. | $Cl_2$ | LT | BTT | H | $CO_2$ | $NClO_2$ | Y(%) |
|---|---|---|---|---|---|---|---|
| 7 | 1.27 | 0 | 910 | + | 1.50 | 0.2908 | 86.39 |
| B | 1.24 | 23 | 890 | + | 0.00 | 0.2801 | 83.21 |
| C | 1.25 | 25 | 340 | − | 0.00 | 0.1339 | 39.78 |
| D | 1.20 | 0 | 400 | − | 1.50 | 0.1186 | 35.23 |

$Cl_2$ = chlorine concentration in the inlet gas
LT = lag time (minutes)
BTT = breakthrough time (minutes)
H = humidity
$CO_2$ = liters of carbon dioxide injected in the column
$NClO_2$ = moles of $ClO_2$ generated
Y = (moles of $ClO_2$ generated/initial moles of $NaClO_2$)

From the results, it can be seen that by pretreating the commercial sodium chlorite and saturating the feed gas with moisture, the lag time can be cut to zero and the amount of chlorine dioxide generated can be approximately doubled.

EXAMPLES 8-24

In Example 8-24, the adsorption characteristics of solid soda-lime when exposed to chlorine are determined.

In these Examples, nitrogen is fed from a gas cylinder through a rotameter and chlorine flows as a gas from a liquid chlorine cylinder through a chlorine rotameter. The two gas streams are mixed and fed to a laboratory-scale 0.0127 m (½ inch) inside diameter and 0.762 m (30 inch) long steel column packed with the afore-mentioned solid technical grade sodium chlorite.

The adsorber is a 0.0127 m (½ inch) inside diameter column made of 304 stainless steel granular or crushed soda-lime. The adsorber comprises a first 0.508 m (20 inch) long filter and a second 0.762 m (30 inch) long filter. Two thermocouples are installed in the first filter, one 0.127 m (5 inches) below the inlet and one 0.127 m (5 inches) above the outlet. Three thermocouples are installed in the second filter, one 0.127 m (5 inches) below the inlet, one 0.361 m (15 inches) from the outlet, and one 0.127 (5 inches) from the outlet.

The nitrogen and chlorine gas streams are mixed and fed directly to the adsorber. A series of 17 runs (corresponding to Examples 8-24) are conducted, a summary of which are provided in Tables 3-5.

TABLE 3

Summary of the Runs Conducted in $Cl_2$ Absorption System

| Run # | Z (m.) | size (mesh) | $C_{Cl_2}$ (mol. %) | $Q_{N_2} \times 10^6$ ($m^3/s$) | Density ($kg/m^3$) |
|---|---|---|---|---|---|
| 8 | 0.4826 | 4-8 | 1.11 | 5.0 | 430.42 |
| 9 | 0.4826 | fines | 1.17 | 5.0 | 495.29 |
| 10 | 0.4826 | fines | 1.18 | 5.0 | 461.01 |
| 11 | 0.4826 | 16-28 | 1.15 | 5.0 | 490.81 |
| 12 | 0.4826 | 8-9 | 1.10 | 5.0 | 461.97 |
| 13 | 0.7366 | 8-9 | 1.07 | 5.0 | 445.15 |
| 14 | 0.7366 | 16-28 | 1.14 | 5.0 | 482.48 |
| 15 | 0.7366 | 4-8 | 1.09 | 5.0 | 434.58 |
| 16 | 0.7366 | 4-8 | 1.05 | 7.5 | 435.38 |
| 17 | 0.4826 | 4-8 | 1.09 | 7.5 | 431.22 |
| 18 | 0.4826 | 16-28 | 1.22 | 7.5 | 489.37 |
| 19 | 0.4826 | 4-8 | 1.19 | 7.5 | 432.98 |
| 20 | 0.4826 | 8-9 | 1.19 | 7.5 | 465.02 |
| 21 | 0.4826 | 14-16 | 1.19 | 7.5 | 489.20 |
| 22 | 0.4826 | 14-16 | 1.31 | 5.0 | 467.42 |
| 23 | 0.7366 | 16-28 | 1.26 | 7.5 | 485.36 |
| 24 | 0.7366 | 8-9 | 1.02 | 7.5 | 476.07 |

Z = height of soda-lime inside the scrubber
size = particle size of the soda-lime
$C_{Cl_2}$ = chlorine concentration
$Q_{N_2}$ = flow rate of nitrogen
Density = density of the soda-lime

TABLE 4

Number of Particles per Unit Weight for the Different Sizes Used

| Size (mesh) | D (mm) | Weight (g) | # | #/g |
|---|---|---|---|---|
| 4–8 | 3.57 | 0.842 | 23 | 27.3 |
| 8–9 | 2.19 | 0.313 | 31 | 99 |
| 10–14 | 1.435 | 0.148 | 129 | 872 |
| 16–28 | 0.7975 | 0.099 | 176 | 1778 |

D = Arithmetic average diameter
# = # of particles

TABLE 5

Observed Breakthrough Times for Chlorine

| Ex. | Size (mesh) | Z (m) | $Q_{N2} \times 10^6$ (m³/s) | TT (min) | BTT (min) |
|---|---|---|---|---|---|
| 9 | fines | 0.4826 | 5.0 | 275 | 350 |
| 10 | fines | 0.4826 | 5.0 | 211 | 290 |
| 12 | 8–9 | 0.4826 | 5.0 | 105 | 140 |
| 16 | 4–8 | 0.7366 | 7.5 | 164 | 185 |
| 17 | 4–8 | 0.4826 | 7.5 | 80 | 92 |
| 20 | 8–9 | 0.4826 | 7.5 | 85 | 97 |
| 21 | 14–16 | 0.4826 | 7.5 | 218 | 272 |

Figure 18:
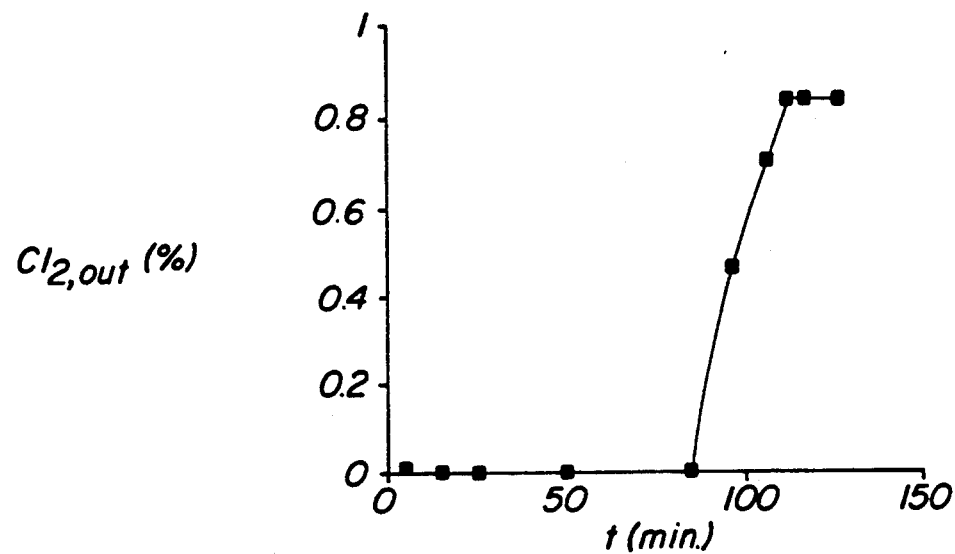
FIGS. 18–21 are graphical presentations of the scrubber characteristics of Example 20.
Figure 19:
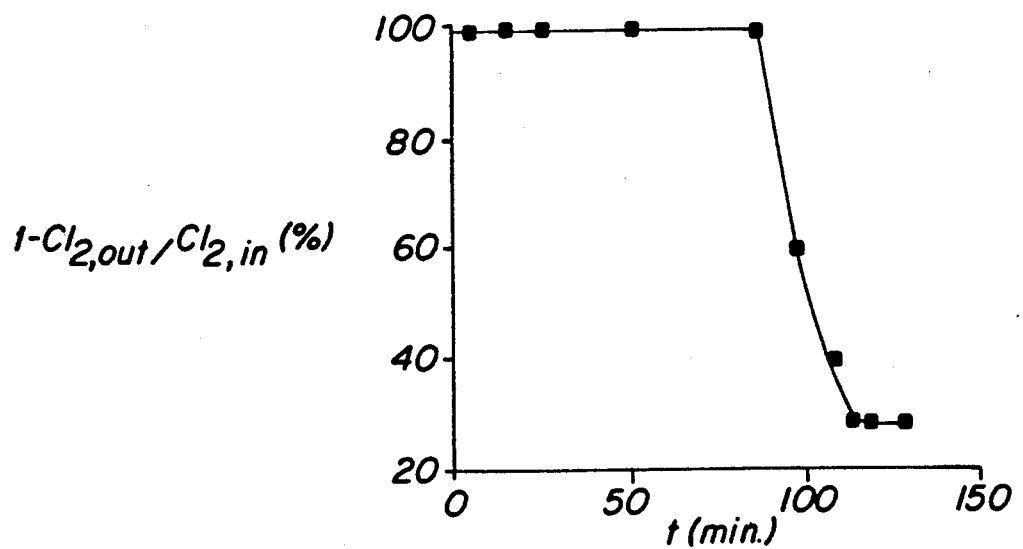

Z = Height of Scrubber
$Q_{N2}$ = N₂ Flow Rate
TT = Time for the Top Thermocouple to Reach the Maximum Temperature
BTT = Experimental Breakthrough time FIGS. 18–21 are graphical presentations of the adsorption characteristics of Example 20. FIG. 18 shows the concentration of chlorine at the outlet over time. FIG. 19 shows the adsorption efficiency (1 - chlorine concentration at the outlet/chlorine concentration at the inlet) over time. From these results, it can be seen that soda-lime adsorbs chlorine with high efficiency (about 99%) during the major stage of reaction. After a period of time, chlorine begins to appear at the outlet of the adsorber (breakthrough time), after which the concentration of chlorine at the outlet increases sharply and quickly reaches another steady state at a concentration slightly lower than that of the inlet feed to the adsorber. FIG. 19 shows that most adsorption occurs prior to breakthrough time.

Figure 20:
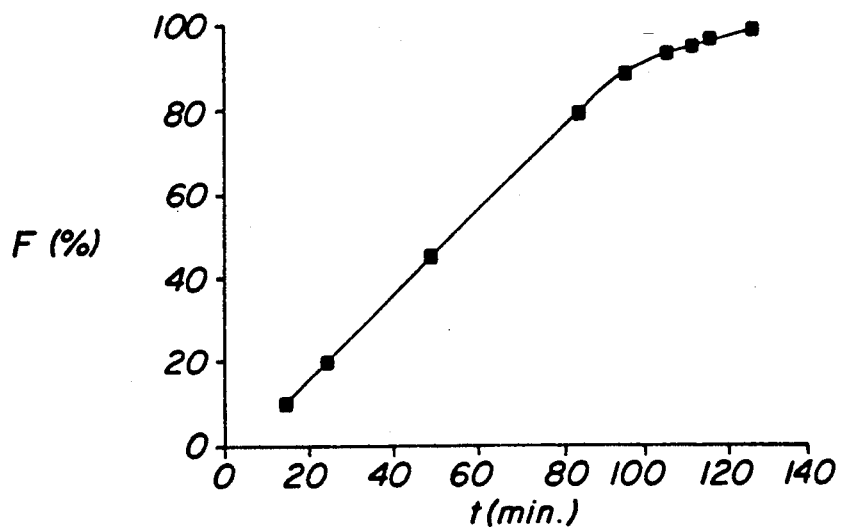

FIG. 20 shows the cumulative fractional chlorine adsorption as a function of time. The data shows almost a straight line in the early period of the adsorption and indicate that the amount of chlorine adsorbed during this period directly varies with time.

Figure 21:
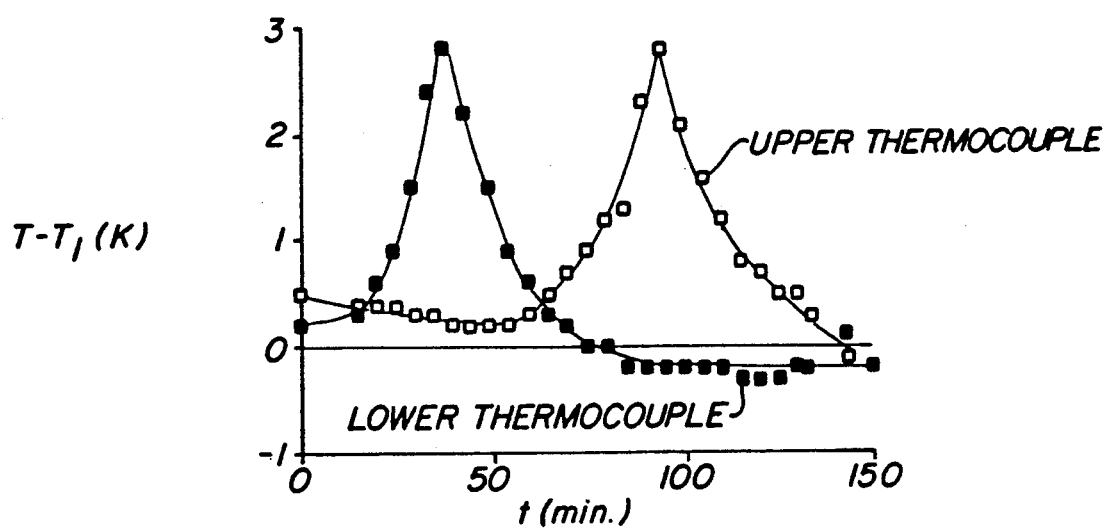

FIG. 21 shows the thermal behavior recorded during the Cl₂ adsorption. The temperature plotted is the thermocouple reading minus the temperature at the inlet of the scrubber. From this figure, the chlorine gas adsorption reaction appears to be an exothermic reaction. The time required for the exothermic front to reach the top thermocouple is about 85 minutes.

These data show that by monitoring the temperature behavior of the adsorber, it is possible to determine the position of the reaction in the column and the time needed to exhaust the soda-lime with Cl₂ gas in the adsorber. It is also possible to determine chlorine breakthrough in the column and thus to shut down or switch over to a fresh column.

EXAMPLES 25–27

Figure 22:
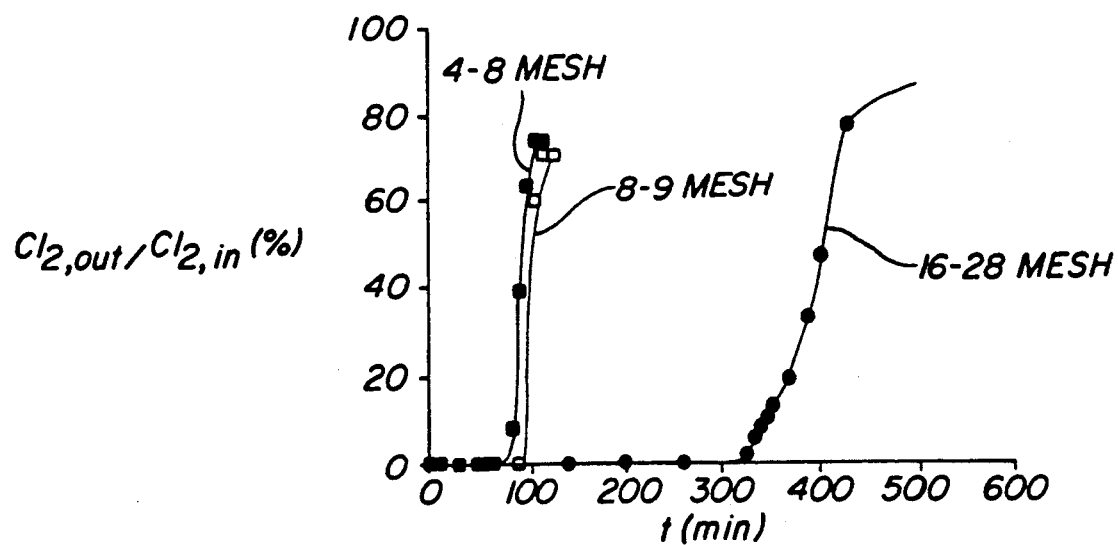
FIG. 22 is a graphical presentation of the effect of soda-lime particle size of Examples 25–27 on the adsorption of chlorine.

In Examples 25–27, the effect of soda-lime particle size on chlorine adsorption is examined using an adsorber similar to that described in Examples 8–24. In these examples, the bulk densities were 434.10, 461.33 and 488.56 kg/m³ for the particle sizes of 4–8, 8–9 and 16–28 mesh, respectively. The nitrogen flow rates is 7.5E-6 m³/s and the results are shown in Table 6 and graphically presented in FIG. 22.

TABLE 6

Effect of Particle Size on Cl₂ Adsorption

| Ex. | $Q_{N2} \times 10^6$ (m³/s) | Z (m) | size (mesh) | $C_{Cl_2}$ (%) | BTT (min) | AC (mol/kg) |
|---|---|---|---|---|---|---|
| 25 | 7.5 | 0.4826 | 4–8 | 1.09 | 92 | 0.7494 |
| 26 | 7.5 | 0.4826 | 8–9 | 1.19 | 97 | 0.7639 |
| 27 | 7.5 | 0.4826 | 16–28 | 1.22 | 350 | 2.8925 |

$Q_{N2}$ = flow rate of nitrogen.
Z = height of soda-lime inside the adsorber.
size = size of soda-lime particles.
$C_{Cl_2}$ = chlorine concentration
BTT = breakthrough time
AC = adsorption capacity based on the breakthrough time.

From these data, it can be seen that if chlorine is adsorbed under the conditions of the same flow rate, and the same scrubber height with 4–8 and 8–9 mesh particles, the breakthrough time of 8–9 mesh is slightly longer than that of 4–8 mesh. After breakthrough time, the adsorption efficiency of soda-lime decreases until a certain point where the ratio of the adsorbed chlorine to the chlorine fed to the scrubber becomes constant again. In general, the particle sizes of 4–8 mesh and 8–9 mesh exhibit similar values of breakthrough time.

In contrast to soda-lime particles with 4–8 and 8–9 mesh, the 16–28 mesh particles have highest adsorption capacity which is approximately three times that of the 4–8 and 8–9 mesh sizes. The breakthrough time is also three times longer than that of 4–8 and 8–9 mesh particles.

After breakthrough time, the adsorption efficiency of soda-lime decrease until a certain value where a certain percentage chlorine fed to the scrubber is adsorbed. The soda-lime can adsorb more chlorine fed to the scrubber as the particle size decreases at low nitrogen flow rates.

EXAMPLES 28–31

In Examples 28–31, the adsorption characteristics of chlorine dioxide on soda-lime are examined using an adsorber similar to that described in Examples 8–24. In these Examples, diluted chlorine dioxide in N₂ is fed at 5.0E-6 m³/s into the column packed with solid soda-lime particles. A summary of various parameters of Examples 28–31 is provided in Table 7.

TABLE 7

Effect of Particle Size on ClO₂ Adsorption

| Ex. | Z (m) | D (mesh) | $C_{ClO_2}$ (%) | Density (kg/m³) | BTT (min) | TAT (min) | AC (mol/kg) | AC' (mol/kg) |
|---|---|---|---|---|---|---|---|---|
| 28 | 0.4826 | 4–8 | 2.30 | 436.18 | 38 | 226 | 0.6085 | 0.4497 |
| 29 | 0.4826 | 10–14 | 1.98 | 472.55 | 37 | 152 | 0.4006 | 0.2683 |
| 30 | 0.7366 | 4–8 | 2.15 | 432.18 | 66 | 148 | 0.6956 | 0.4661 |

TABLE 7-continued

| | | | Effect of Particle Size on ClO$_2$ Adsorption | | | | | |
|---|---|---|---|---|---|---|---|---|
| Ex. | Z (m) | D (mesh) | C$_{ClO_2}$ (%) | Density (kg/m$^3$) | BTT (min) | TAT (min) | AC (mol/kg) | AC' (mol/kg) |
| 31 | 0.7366 | 10–14 | 2.11 | 480.39 | 74 | 175 | 0.5474 | 0.3600 |

Figure 23:
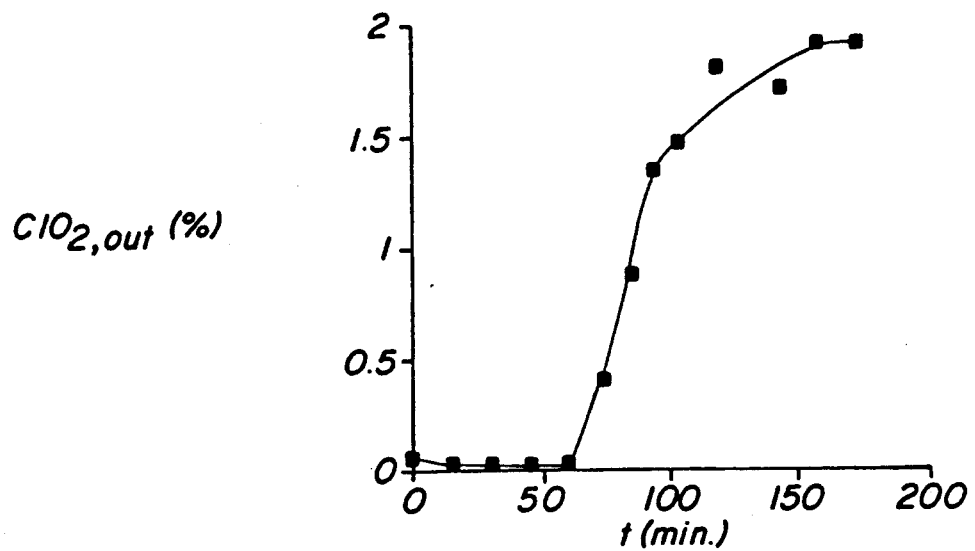
FIG. 23–25 are graphical presentations of the adsorption characteristics of chlorine dioxide on soda-lime of Example 31.
Figure 24:
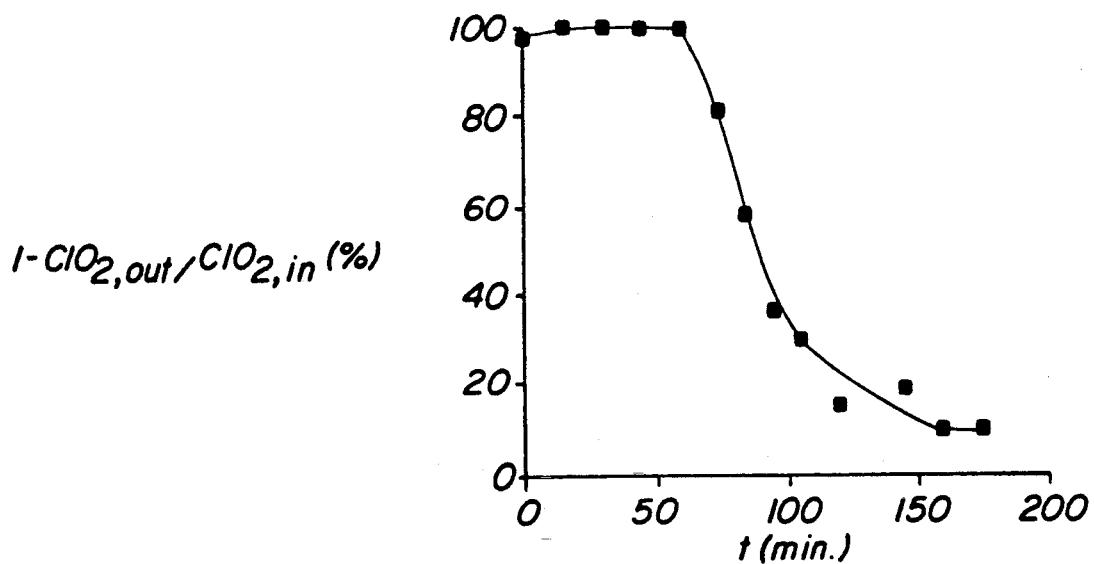
Figure 25:
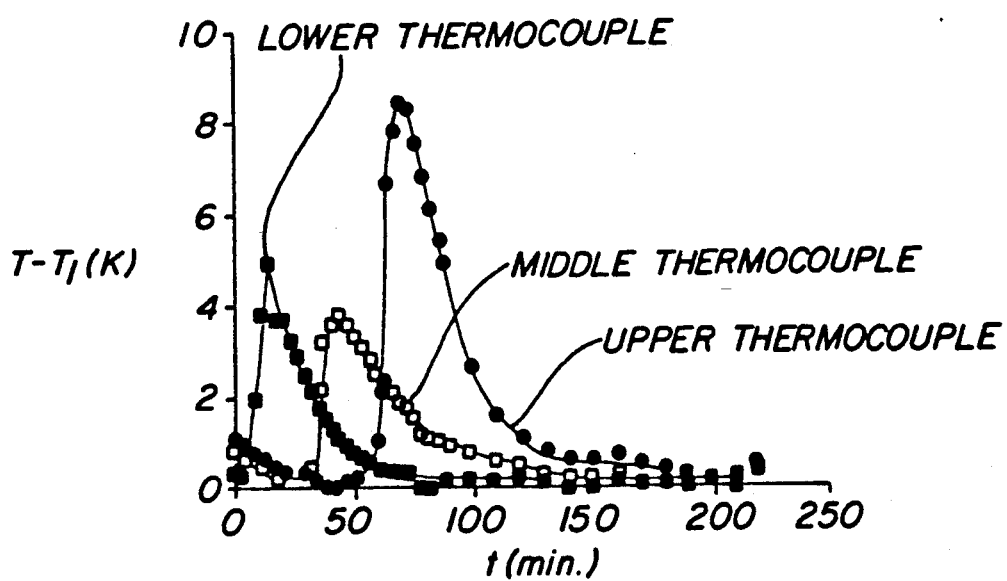

Z = Weight of scrubber
D = Mesh of soda-lime particles
C$_{ClO_2}$ = Concentration of chlorine dioxide
Density = bulk density of soda-lime
BTT = breakthrough time
TAT = total reaction time
AC = adsorption capacity based on the total reaction time
AC' = adsorption capacity based on the breakthrough time FIGS. 23–25 graphically present the results obtained in Example 31. In FIG. 23, the concentration of chlorine dioxide at the outlet is plotted versus time. In FIG. 24, the adsorption efficiency (1- chlorine dioxide concentration at the outlet/chlorine dioxide at the inlet) is plotted against time. In FIG. 25, the thermal behavior of the adsorber is plotted against time for each thermocouple in the second section of the adsorber.

From the data presented, it can be seen that no chlorine dioxide flows out of the adsorber during the first stage of adsorption.

After a period of time, the chlorine dioxide begins to appear at the outlet of the adsorber, which is the breakthrough time (BTT). The first stage of adsorption for the chlorine dioxide is shorter than for chlorine. After the breakthrough time, the concentration of chlorine dioxide at the outlet of the scrubber increases steeply and quickly reaches another steady state at a concentration slightly lower than that of the inlet feed to the adsorber. The adsorption capacity of the soda-lime quickly decreases after breakthrough.

The chlorine dioxide gas adsorption reaction appears to be exothermic, as is the reaction of chlorine with soda-lime particles. The time required for the exothermic front to travel to the top thermocouple is about 70 minutes.

Figure 26:
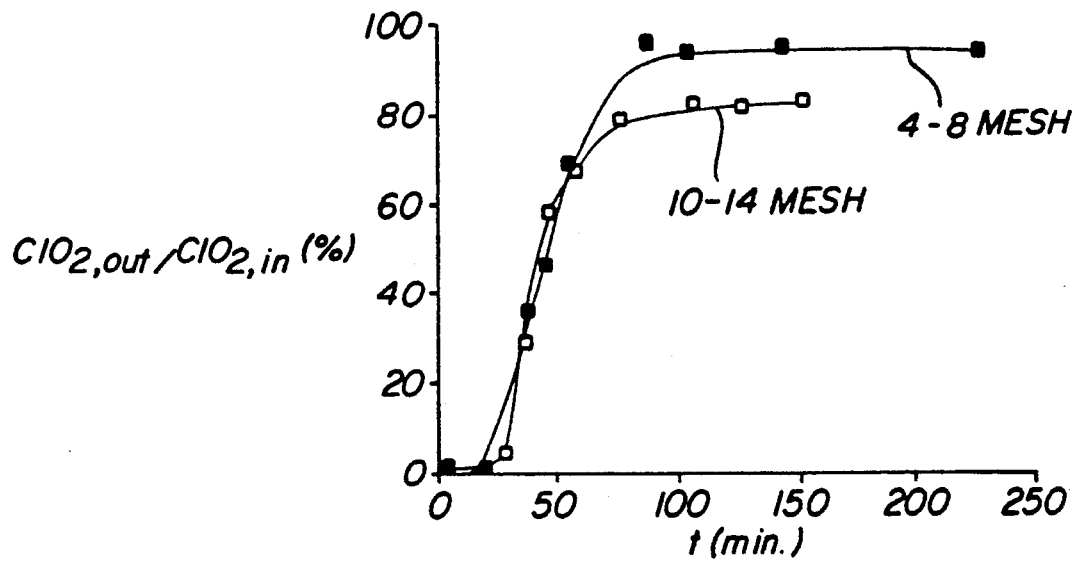
FIG. 26 is a graphical presentation of the effect of soda-lime particle size of Examples 28 and 29 on chlorine dioxide adsorption.
Figure 27:
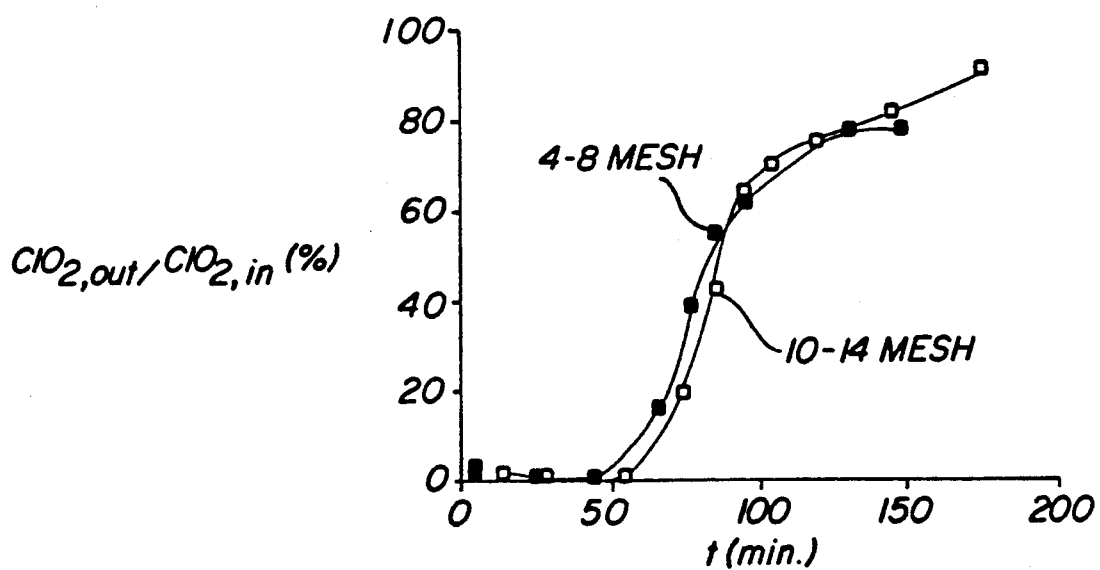
FIG. 27 is a graphical presentation of the effect of soda-lime particle size of Examples 30 and 31 on chlorine dioxide adsorption.

The effect of particle size on chlorine dioxide adsorption is also examined in these examples. The results are provided in Table 7, and graphically presented for Examples 28 and 29 in FIG. 26 and for Examples 30 and 31 in FIG. 27 From these data, it can be seen that, in contrast to the chlorine/soda-lime adsorption system, as the particle size increases, the adsorption of chlorine dioxide onto soda-lime becomes more efficient. Under the same flow rate and same length of the adsorber, the breakthrough time or one two particle sizes are almost the same.

EXAMPLES 32–35

In Examples 32–35, experiments are performed to determine an optimum composition for a sodium thiosulfate-based scrubber liquid for use in converting gaseous chlorine dioxide to a non-volatile product.

A simple bubbler type of scrubber is constructed from 2 inch internal diameter by 36 inch long PVC threaded at both ends, with Standard PVC unions serving as end caps. A disk of ⅛ inch thick clear acrylic sheet, perforated with approximately 100 1/16 inch holes is fixed into each union to serve as a bubble plate in the bottom and to minimize liquid surges in the top. No packing is used. The scrubber is filled with 500 ml of scrubber solution.

Experiments are run by filling the sterilizer chamber with chlorine dioxide nitrogen mixture, determining the chlorine dioxide concentration and then evacuating the chamber (25 in. Hg) through the scrubber. The chamber is then refilled with air and the evacuation repeated. The chamber is again refilled with air, evacuated and refilled a third time. This evacuation and refill routine is sufficient to remove the chlorine dioxide in the chamber down to a level considered to be insignificant for purposes of these experiments. The pH of the scrubber solution is determined and, if breakthrough has not occurred, the chamber is again evacuated and refilled with chlorine dioxide and the process repeated. The cycle of chlorine dioxide fill and chamber purge is repeated until scrubber exhaustion is observed.

For purposes of these experiments, scrubber exhaustion is taken to be that time when a signal of greater than 10 cm is observed in the UV readout (approximately 1000 ppm). Scrubber effluent is monitored for chlorine dioxide by means of an ultraviolet spectrophotometer fitted with a 1 cm flow cell. The low limit of detection with this arrangement is approximately 50 ppm.

In Example 32, the scrubber solution comprises 50 g sodium thiosulfate, 25 g sodium hydroxide, and a sufficient quantity of distilled deionized water to make 500 ml of solution. The pH of the scrubber solution is about 13.4. The results are provided in Table 8.

TABLE 8

| Fill # | Concentration ClO$_2$ (mg/l) | Grams ClO$_2$ /Chamber | Breakthrough Peak Height (ca) During Purge with GAST TM Pump | | | Scrubber pH After Purge |
|---|---|---|---|---|---|---|
| | | | #1 | #2 | #3 | #3 |
| 1 | 66.8 | 3.78 | 3.8 | 0.0 | 0.0 | 13.2 |
| 2 | 68.7 | 3.89 | 1.2 | 0.0 | 0.0 | 13.1 |
| 3 | 64.0 | 3.62 | 2.0 | 0.0 | 0.0 | 13.0 |
| 4 | 65.5 | 3.71 | 4.2 | 1.2 | 0.0 | 1.9 |
| 5 | 63.0 | 3.57 | 12.8 | — | — | 1.3 |

Breakthrough - 15.0 g ClO$_2$ Scrubbed

In Example 33, the scrubber solution comprises 50 g sodium thiosulfate, 50 g sodium hydroxide, and a sufficient quantity of distilled deionized water to make 500 ml. The pH of the liquid is about 13.7. The results are provided in Table 9.

TABLE 9

| Fill # | Concentration ClO$_2$ (mg/l) | Grams ClO$_2$ /Chamber | Breakthrough Peak Height (ca) During Purge with GAST TM Pump | | | Scrubber pH After Purge |
|---|---|---|---|---|---|---|
| | | | #1 | #2 | #3 | #3 |
| 1 | 68.0 | 3.85 | 7.8 | 0.1 | 0.0 | 13.7 |
| 2 | 68.4 | 3.87 | 4.6 | 0.4 | 0.0 | 13.7 |
| 3 | 72.5 | 4.10 | 3.3 | 0.3 | 0.0 | 13.7 |
| 4 | 46.1 | 2.61 | 4.4 | 0.6 | 0.0 | 13.7 |
| 5 | 62.7 | 3.55 | 6.5 | 0.7 | 0.0 | 13.7 |
| 6 | 67.9 | 3.84 | 8.1 | 0.5 | 0.0 | 13.6 |
| 7 | 65.3 | 3.70 | 6.5 | 0.8 | 0.1 | — |
| 8 | 66.9 | 3.79 | 11.0 | 0.9 | 0.1 | 13.5 |

TABLE 9-continued

| Fill # | Concentration ClO2 (mg/l) | Grams ClO2 /Chamber | Breakthrough Peak Height (ca) During Purge with GAST ™ Pump | | | Scrubber pH After Purge |
|---|---|---|---|---|---|---|
| | | | #1 | #2 | #3 | #3 |
| 9 | 65.6 | 3.71 | 12.3 | 1.7 | 0.1 | 13.4 |
| 10 | 65.5 | 3.71 | 13.2 | 2.1 | 0.3 | 13.3 |
| 11 | 69.3 | 3.92 | 14.7 | 3.7 | 0.2 | 13.2 |

Breakthrough = 25.5 g ClO2 Scrubbed
indicates average of 10 concentrations since measured values are not available for Fill #7

In Examples 32 and 33 (no column packing), breakthrough is taken to be that time when the UV signal is greater than 10 cm.

In Example 34, a more efficient scrubber configuration is prepared by including packing comprising small (approx. ¼ in.) pieces of broken glass to fill the column to about 2 inches from the top. The scrubber also includes 500 ml of scrubber liquid prepared according to Example 33. The upper perforated acrylic disk serves to prevent packing from being pushed out of the column and into the exit line during the initial pump surge. The results are provided in Table 10.

TABLE 10

| Fill # | Concentration ClO2 (mg/l) | Grams ClO2 /Chamber | Breakthrough Peak Height (ca) During Purge with GAST ™ Pump | | | Scrubber pH After Purge |
|---|---|---|---|---|---|---|
| | | | #1 | #2 | #3 | #3 |
| 1 | 48.0 | 2.72 | 0.2 | 0.0 | 0.0 | 13.5 |
| 2 | 57.4 | 3.25 | 0.0 | 0.0 | 0.0 | 13.4 |
| 3 | 62.2 | 3.52 | 0.0 | 0.0 | 0.0 | 13.4 |
| 4 | 60.6 | 3.43 | 0.0 | 0.0 | 0.0 | 13.4 |
| 5 | 51.2 | 2.90 | 0.0 | 0.0 | 0.0 | 13.4 |
| 6 | 58.8 | 3.21 | 0.0 | 0.0 | 0.0 | 13.4 |
| 7 | 60.3 | 3.41 | 1.0 | 0.0 | 0.0 | 13.3 |
| 8 | 51.9 | 2.94 | 2.8 | 0.0 | 0.0 | 13.1 |

Breakthrough - 19.0 g ClO2 scrubbed

In Example 35, the scrubber liquid comprises 100 g sodium thiosulfate, 100 g sodium hydroxide and a sufficient quantity of distilled deionized water to make 500 ml. The pH of the scrubber liquid is 13.9. The results are provided in Table 11.

TABLE 11

| Fill # | Concentration ClO2 (mg/l) | Grams ClO2 /Chamber | Breakthrough Peak Height (ca) During Purge with GAST ™ Pump | | | Scrubber pH After Purge |
|---|---|---|---|---|---|---|
| | | | #1 | #2 | #3 | #3 |
| 1 | 52.7 | 2.98 | 0.0 | 0.0 | 0.0 | 13.8 |
| 2 | 60.3 | 3.41 | 0.0 | 0.0 | 0.0 | — |
| 3 | 50.5 | 2.86 | 0.0 | 0.0 | 0.0 | 13.9 |
| 4 | 66.9 | 3.79 | 0.0 | 0.0 | 0.0 | — |
| 5 | 60.9 | 3.45 | 0.0 | 0.0 | 0.0 | 13.9 |
| 6 | 59.1 | 3.35 | 0.0 | 0.0 | 0.0 | — |
| 7 | 61.4 | 3.48 | 0.0 | 0.0 | 0.0 | 13.8 |
| 8 | 63.8 | 3.54 | 0.4 | 0.0 | 0.0 | — |
| 9 | 56.9 | 3.22 | 0.6 | 0.0 | 0.0 | 13.7 |
| 10 | 58.0 | 3.28 | 0.9 | 0.0 | 0.0 | — |
| 11 | 59.5 | 3.37 | 1.9 | 0.0 | 0.0 | 13.7 |
| 12 | 59.1 | 3.35 | 2.6 | 0.0 | 0.0 | 13.7 |
| 13 | 58.3 | 3.30 | 3.8 | 0.0 | 0.0 | 13.6 |

Breakthrough - 33.4 g ClO2 Scrubbed

In Examples 34 and 35 (column packing), breakthrough is taken to be that time when the UV signal is greater than 1 cm.

Since the scrubber setup used in Examples 32 and 33 is not optimized, some chlorine dioxide breakthrough is observed even with fresh scrubbing liquid. However, exhaustion of the scrubber is observed by a noticeable increase in the amount of chlorine dioxide appearing in the scrubber effluent. In later experiments using packed columns, breakthrough is not observed (within the detection limit of the spectrophotometer) until the scrubber is exhausted.

In Comparative Example E, the scrubber solution comprises 100 g sodium thiosulfate and 500 ml of distilled deionized water. The pH of the scrubber liquid at the outset is about 9.7. The results are provided in Table 12.

TABLE 12

| Fill # | Concentration ClO2 (mg/l) | Grams ClO2 /Chamber | Breakthrough Peak Height (ca) During Purge with GAST ™ Pump | | | Scrubber pH After Purge |
|---|---|---|---|---|---|---|
| | | | #1 | #2 | #3 | #3 |
| 1 | 59.1 | 3.35 | 4.3 | 0.4 | 0.0 | 9.8 |
| 2 | 61.1 | 3.46 | 5.0 | 0.5 | 0.0 | 9.7 |
| 3 | 65.9 | 3.73 | 6.4 | 0.6 | 0.0 | 9.7 |
| 4 | 59.8 | 3.38 | 10.3 | 2.5 | 0.4 | 1.9 |

Breakthrough - 10.5 g ClO2 Scrubbed

The results of the above experiments show that the addition of sodium hydroxide to the thiosulfate solution markedly extends the scrubber life as compared to a scrubber liquid comprising sodium thiosulfate without an additional base. The results of these experiments and others show that when the sodium hydroxide is provided in the scrubber liquid in an amount equal to the sodium thiosulfate by weight, the thiosulfate can be substantially completely consumed (as indicated by chlorine dioxide breakthrough) while the pH remained alkaline. Also, these experiments show that the scrubbing liquids containing the sodium thiosulfate/sodium hydroxide mixture have a greater scrubbing capacity than those in which the pH is allowed to become acidic.

The optimum scrubber capacity in these experiments occur when the sodium thiosulfate comprises about 20% by weight of the scrubber liquid. More particularly, the optimum composition for the sodium thiosulfate scrubbing liquid is shown to be 100 g each of sodium thiosulfate and sodium hydroxide per 500 ml scrubbing liquid.

In summary, the experiments show that sodium thiosulfate when maintained at an alkaline pH is an effective scrubbing medium for the removal of $ClO_2$ from sterilizer effluents.

The examples provided above are not meant to be exclusive. Many other variations of the present invention would be obvious to those skilled in the art. For example, those aspects of the present invention relating to adsorption of chlorine gas from a gas mixture comprising chlorine and chlorine dioxide may be used in conjunction with other chlorine dioxide generating systems. Likewise, those aspects of the present invention relating to the elimination of chlorine dioxide via the scrubber of the present invention may also be used in conjunction with other uses of chlorine dioxide not specifically mentioned herein. All such obvious modifications are contemplated to be within the scope of the appended claims.

We claim:

1. A composition for selectively removing chlorine gas from a humidified gaseous stream at about ambient temperature comprising chlorine dioxide and chlorine comprising soda-lime particles having an average particle size of about 10 mesh or smaller.

2. The composition of claim 1, wherein said soda-lime particles have an average particle size of about 16 mesh or smaller.

3. A method for selectively removing chlorine gas from a humidified gaseous mixture at about ambient temperature comprising chlorine dioxide and chlorine, comprising contacting said gaseous stream with a composition comprising solid soda-lime particles having an average particle size of about 10 mesh or smaller.

* * * * *